Figure 1:
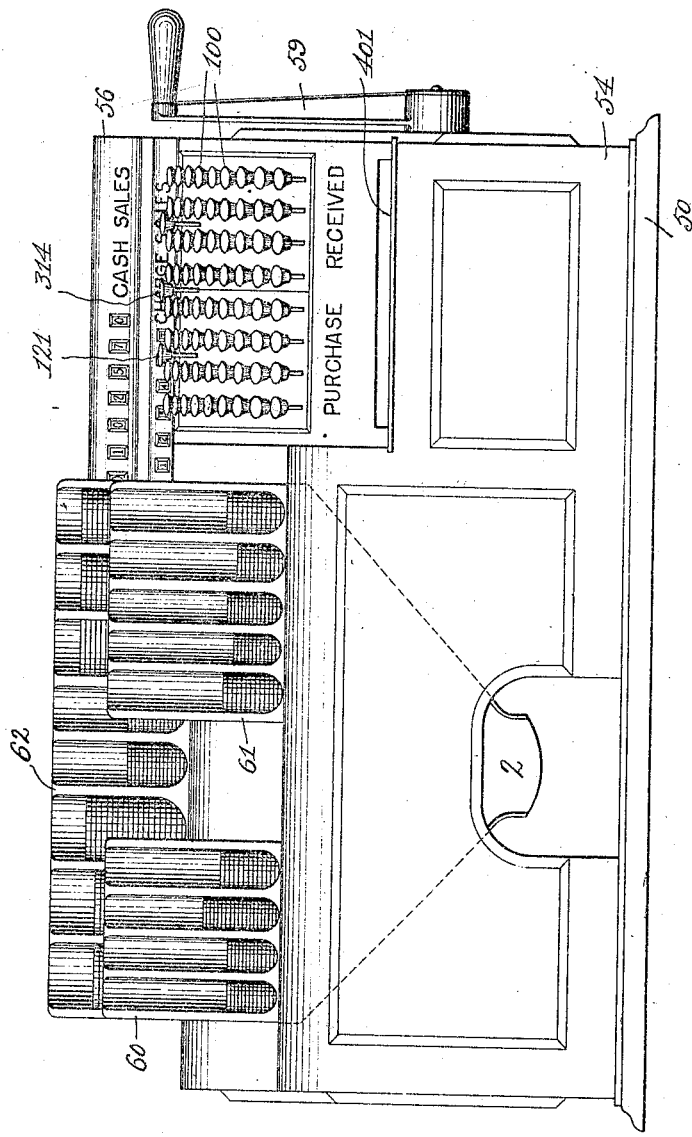

T. I. POTTER.
CHANGE MAKING, REGISTERING, AND RECORDING MACHINE.
APPLICATION FILED APR. 7, 1913.

1,197,062.

Patented Sept. 5, 1916.
19 SHEETS—SHEET 2.

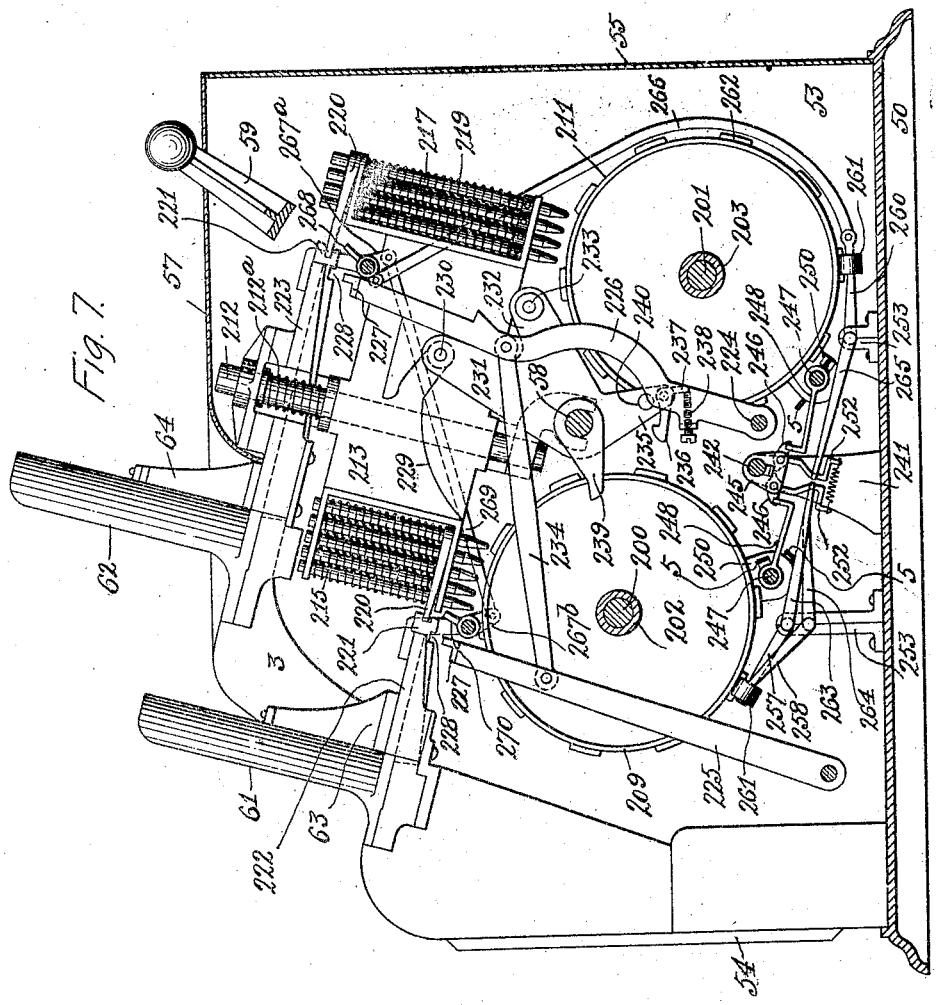

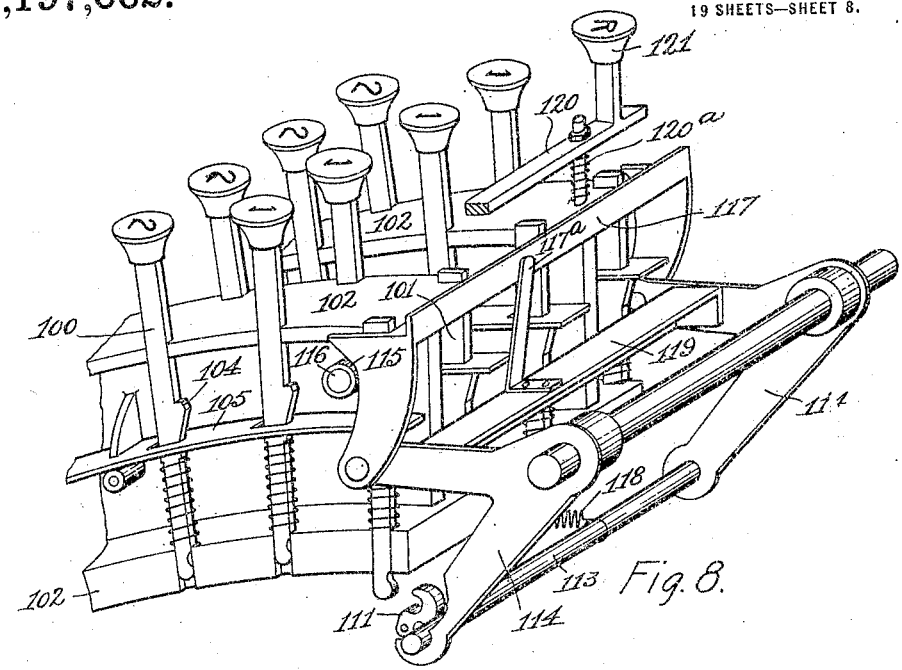
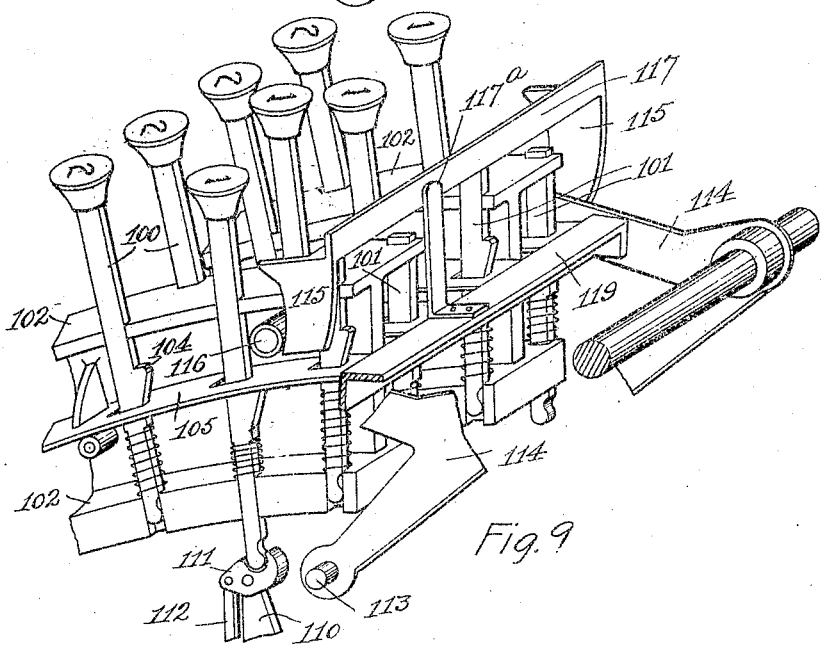

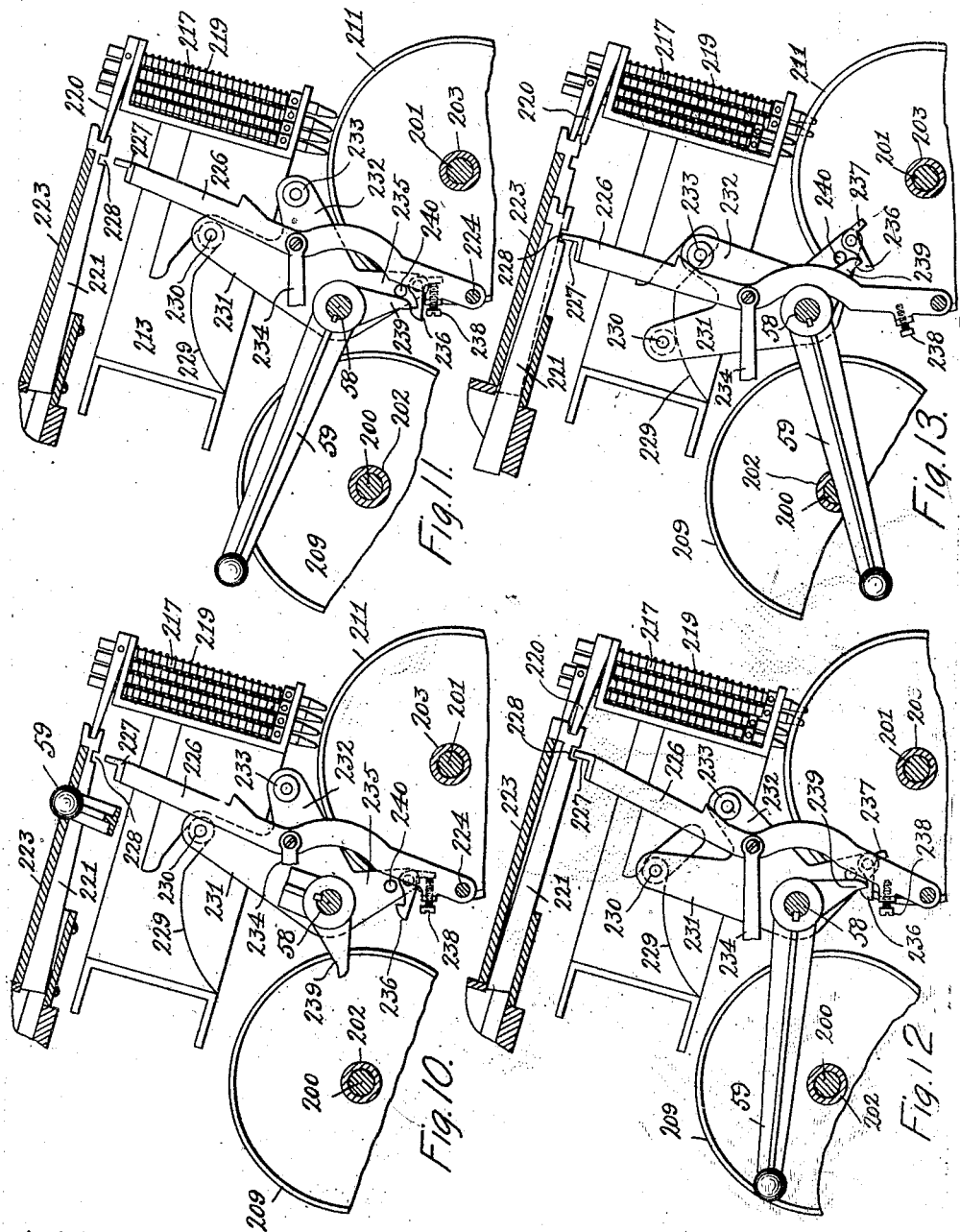

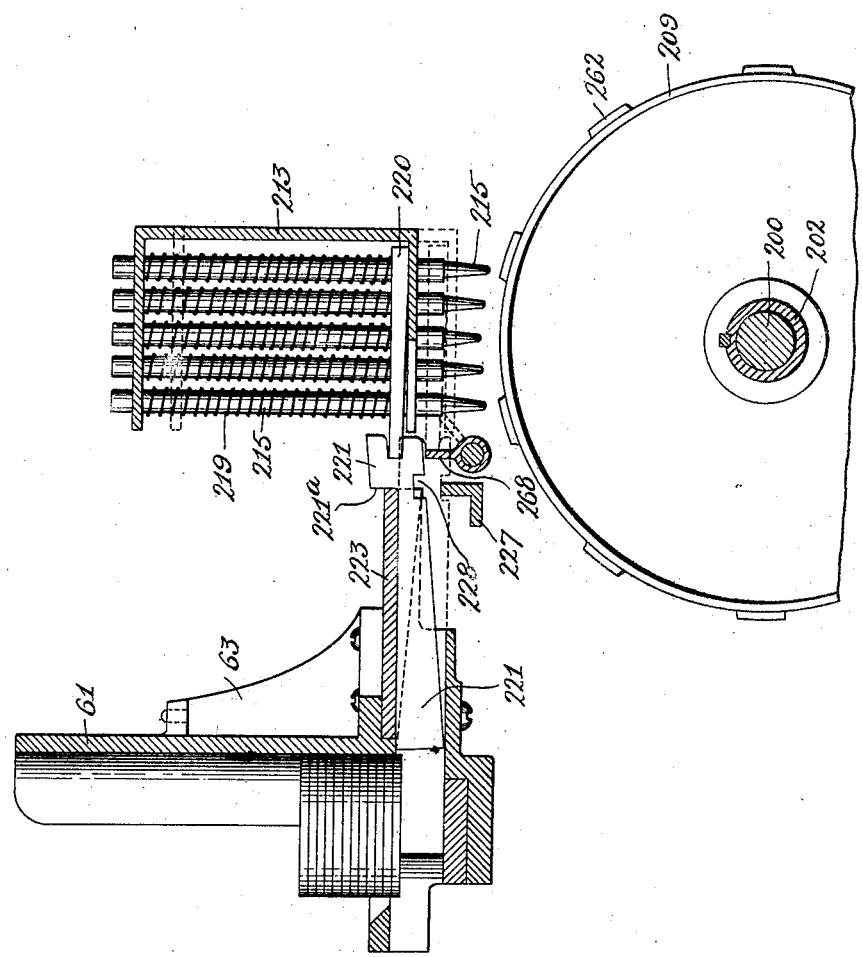

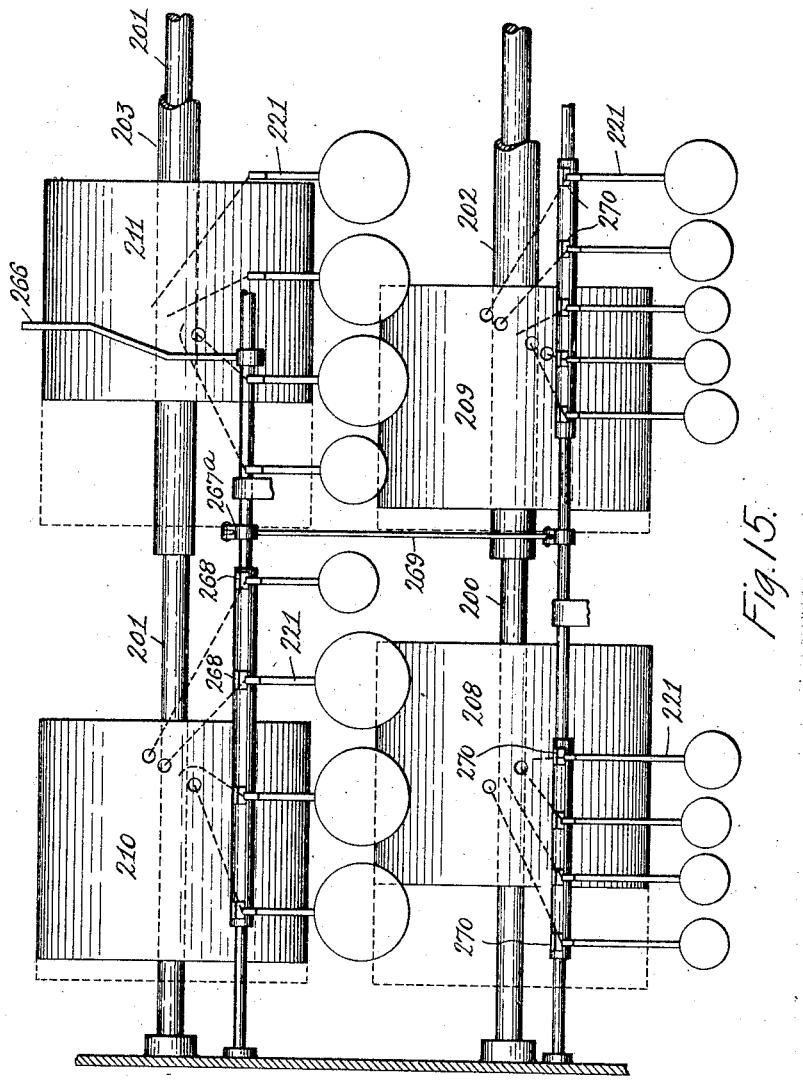

T. I. POTTER.
CHANGE MAKING, REGISTERING, AND RECORDING MACHINE.
APPLICATION FILED APR. 7, 1913.

1,197,062. Patented Sept. 5, 1916.
19 SHEETS—SHEET 13.

Witnesses.
Inventor.

T. I. POTTER.
CHANGE MAKING, REGISTERING, AND RECORDING MACHINE.
APPLICATION FILED APR. 7, 1913.

1,197,062.

Patented Sept. 5, 1916.
19 SHEETS—SHEET 14.

Witnesses.
Halbert Brown
Thomas Durant

Inventor.
Thomas Irving Potter
by Church & Church
his Attorneys.

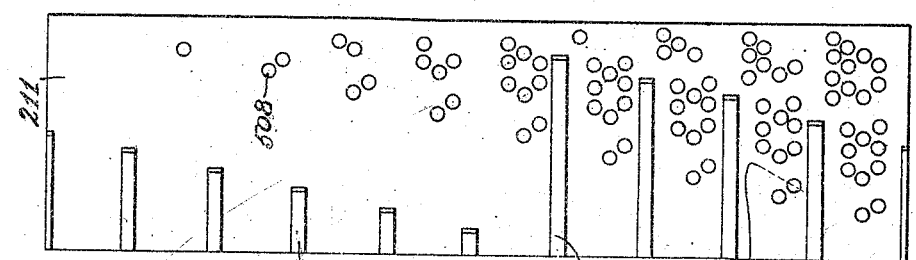
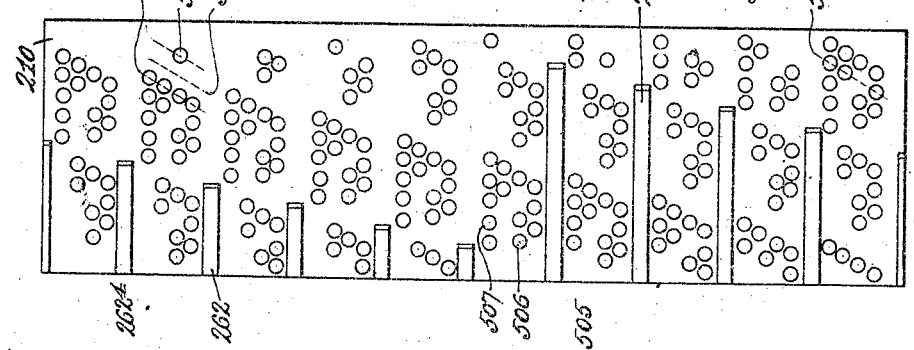
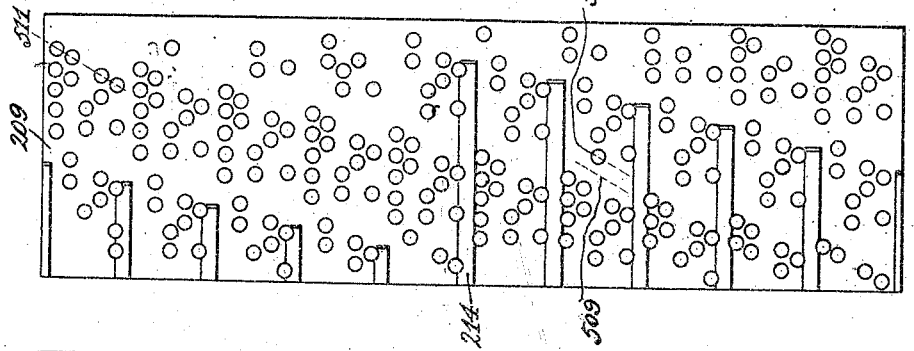
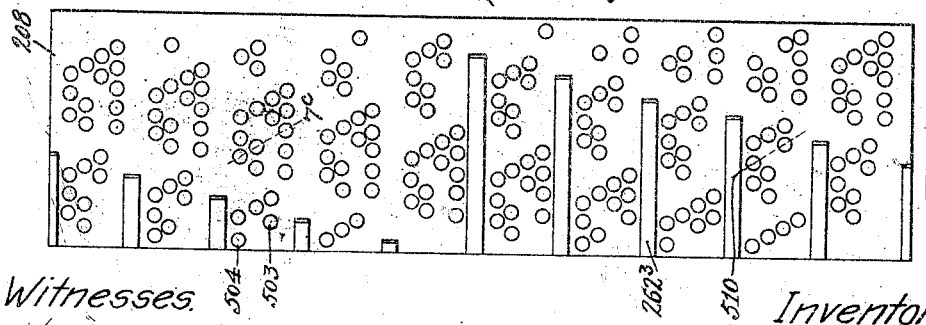

T. I. POTTER.
CHANGE MAKING, REGISTERING, AND RECORDING MACHINE.
APPLICATION FILED APR. 7, 1913.
1,197,062.
Patented Sept. 5, 1916.
19 SHEETS—SHEET 16.
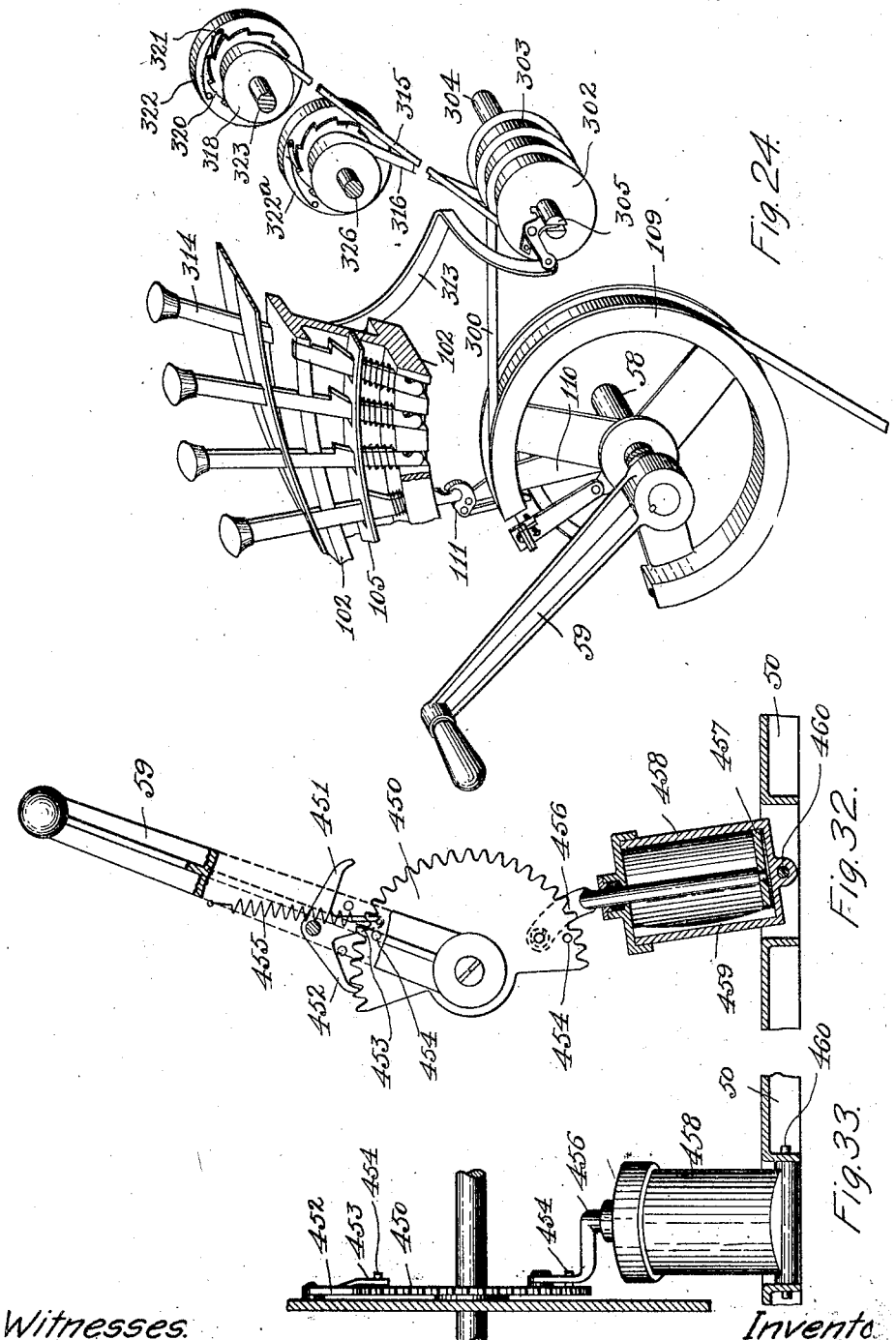

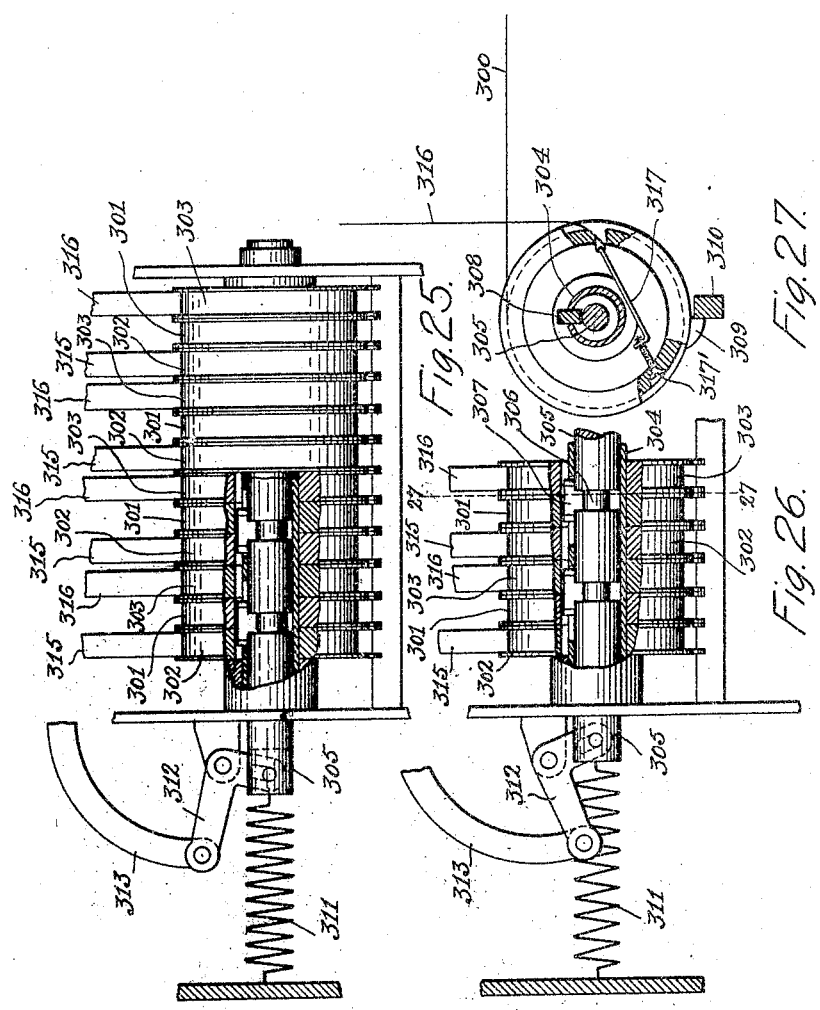

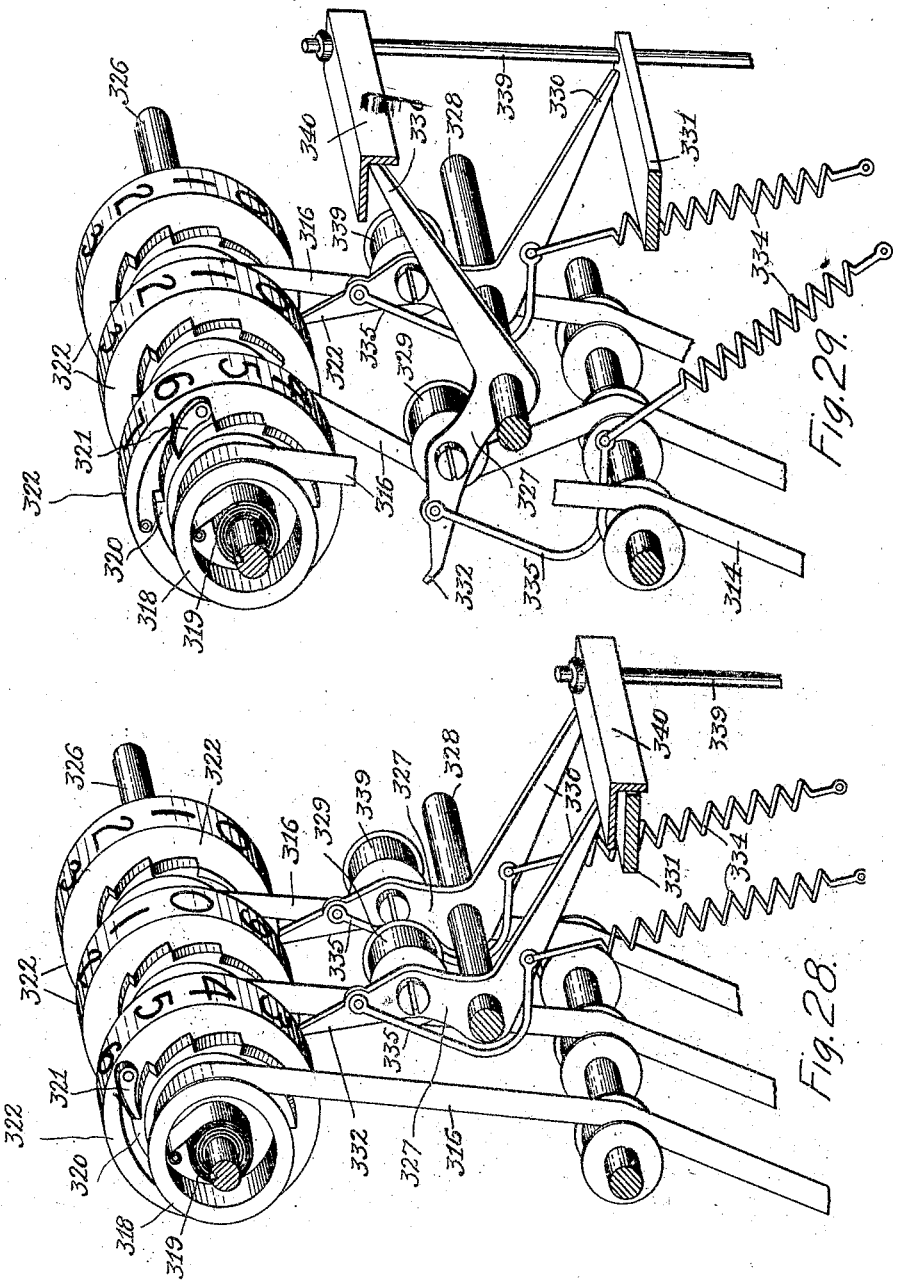

T. I. POTTER.
CHANGE MAKING, REGISTERING, AND RECORDING MACHINE.
APPLICATION FILED APR. 7, 1913.

1,197,062. Patented Sept. 5, 1916.
19 SHEETS—SHEET 19.

UNITED STATES PATENT OFFICE.

THOMAS IRVING POTTER, OF PORTLAND, OREGON.

CHANGE-MAKING, REGISTERING, AND RECORDING MACHINE.

1,197,062.  Specification of Letters Patent.  Patented Sept. 5, 1916.

Application filed April 7, 1913. Serial No. 759,471.

*To all whom it may concern:*

Be it known that I, THOMAS IRVING POTTER, a citizen of the United States, residing at Portland, in the county of Multnomah and State of Oregon, have invented certain new and useful Improvements in Change-Making, Registering, and Recording Machines; and I do hereby declare the following to be a full, clear, and exact description of the same, reference being had to the accompanying drawings, forming part of this specification, and to the figures and letters of reference marked thereon.

This invention relates primarily to machines designed for handling money, and, through the manipulation of suitable keys, computing the results desired from the factors entering into the transaction. The principles of the machine are applicable to various types of computing machines, but the most obvious field for mechanism of this character is in change making machines, and, therefore, the invention will be described as adapted for transactions in which a merchant and his customer are dealing with each other, and in which transactions money passes from the customer to the merchant. The function of the machine is to return to the customer the proper change due him in the transaction, to make registration of the amount of the sale and to make a record of the transaction on a suitable check, sales slip or strip.

The objects of the invention, generally stated, are to simplify and improve the mechanism, whereby the necessity for any mental calculation on the part of the user of the machine will be eliminated, and whereby correct results will be insured in all transactions within the capacity of the machine.

A further object of the invention is to provide a machine embodying in its construction denominational groups of elements, each group of which is competent to operate within its capacity for the computation of transactions of a limited character, but the several groups being so correlated as that they will operate on the decimal or other approved system for the simplification of transactions and the elimination of complicated computations or what is the equivalent thereof, complicated permutations of the computing mechanism.
A further object of the invention is to provide a machine embodying operative elements divided into denominational groups in which all of the movements necessary in the computations will be effected by advance movements of the parts rather than by first advancing the parts beyond the positions to be occupied by them at the conclusion of the transaction, and then retracting them by the manipulation of a different set of factors, as has heretofore been proposed.

Figure 2:
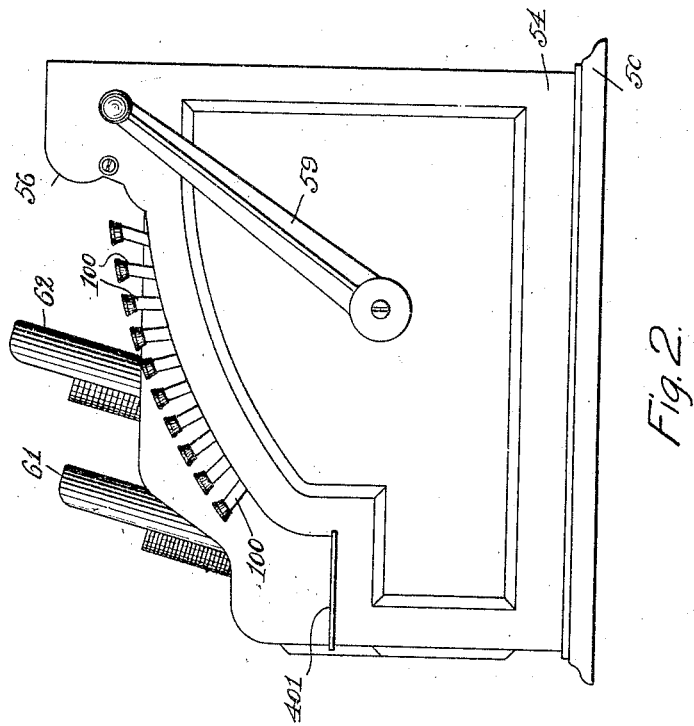
Figure 3:
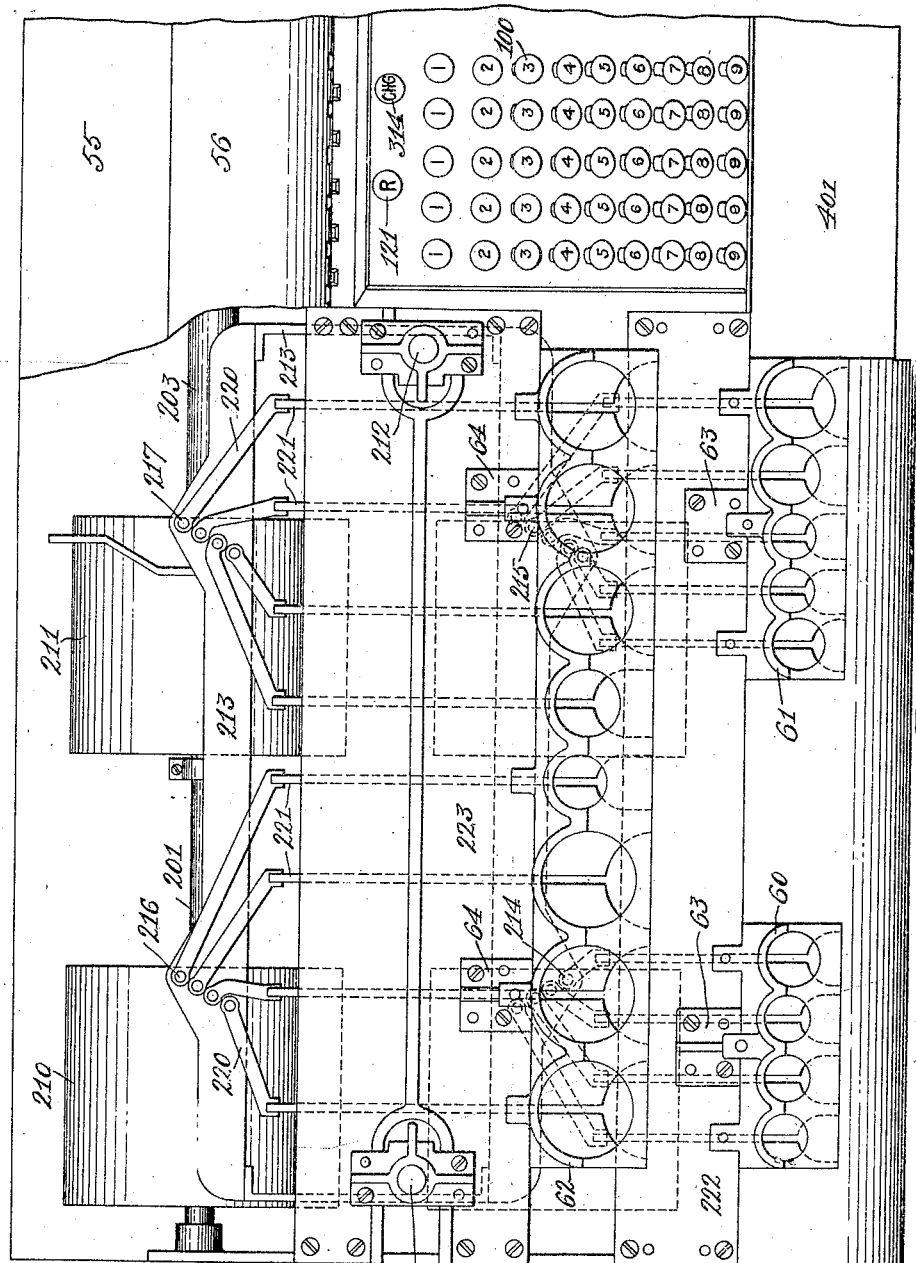
Figure 4:
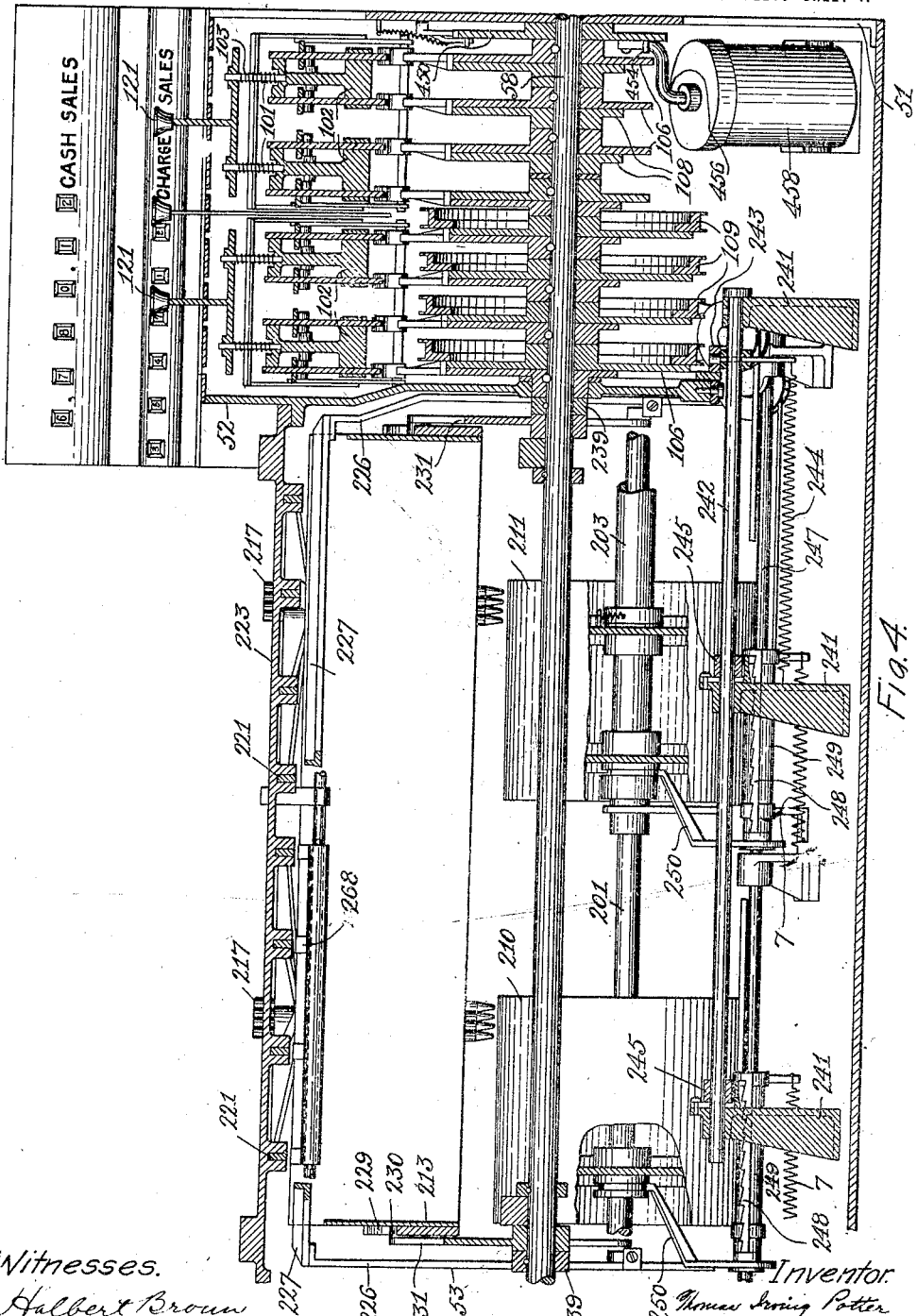
Figure 5:
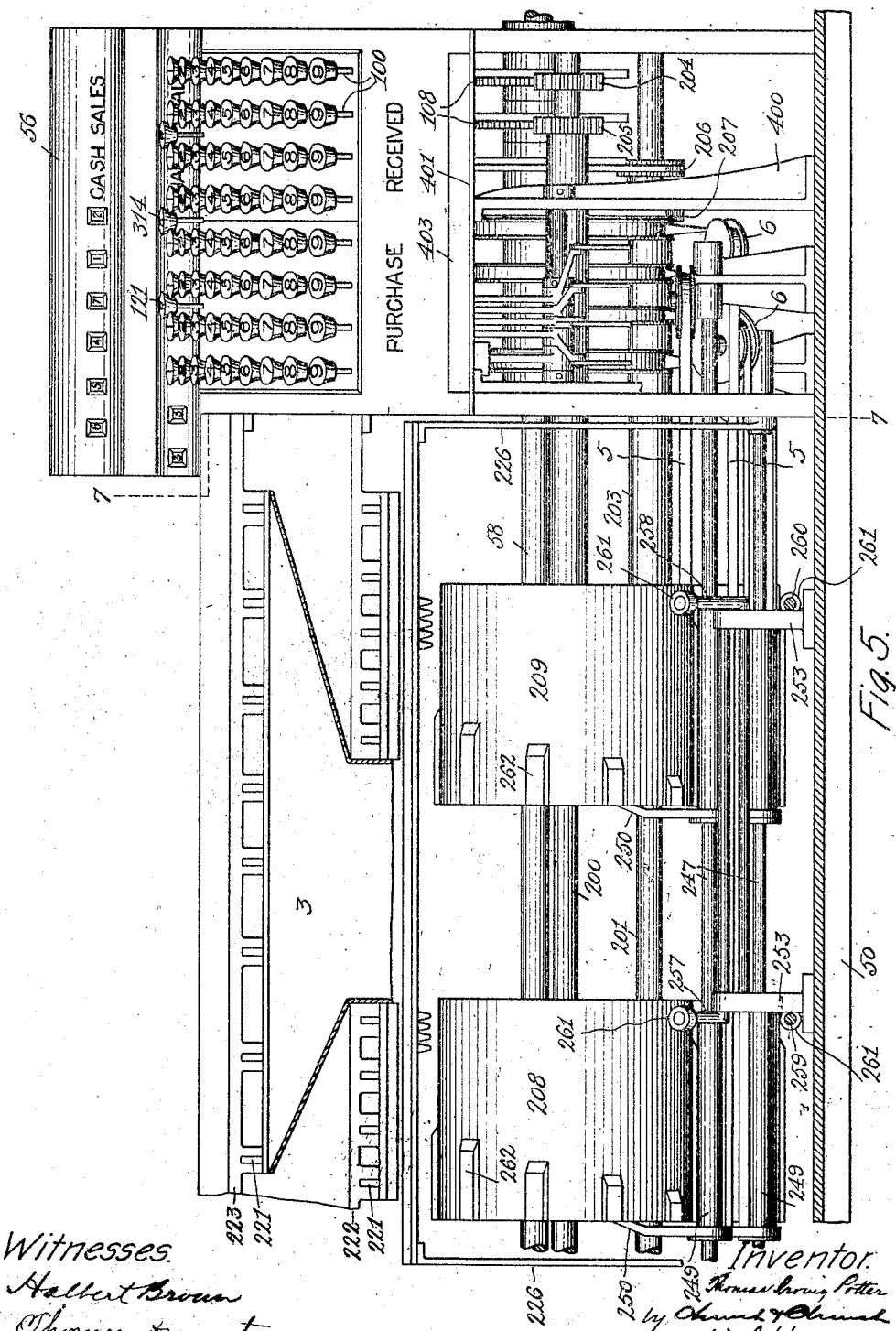
Figure 6:
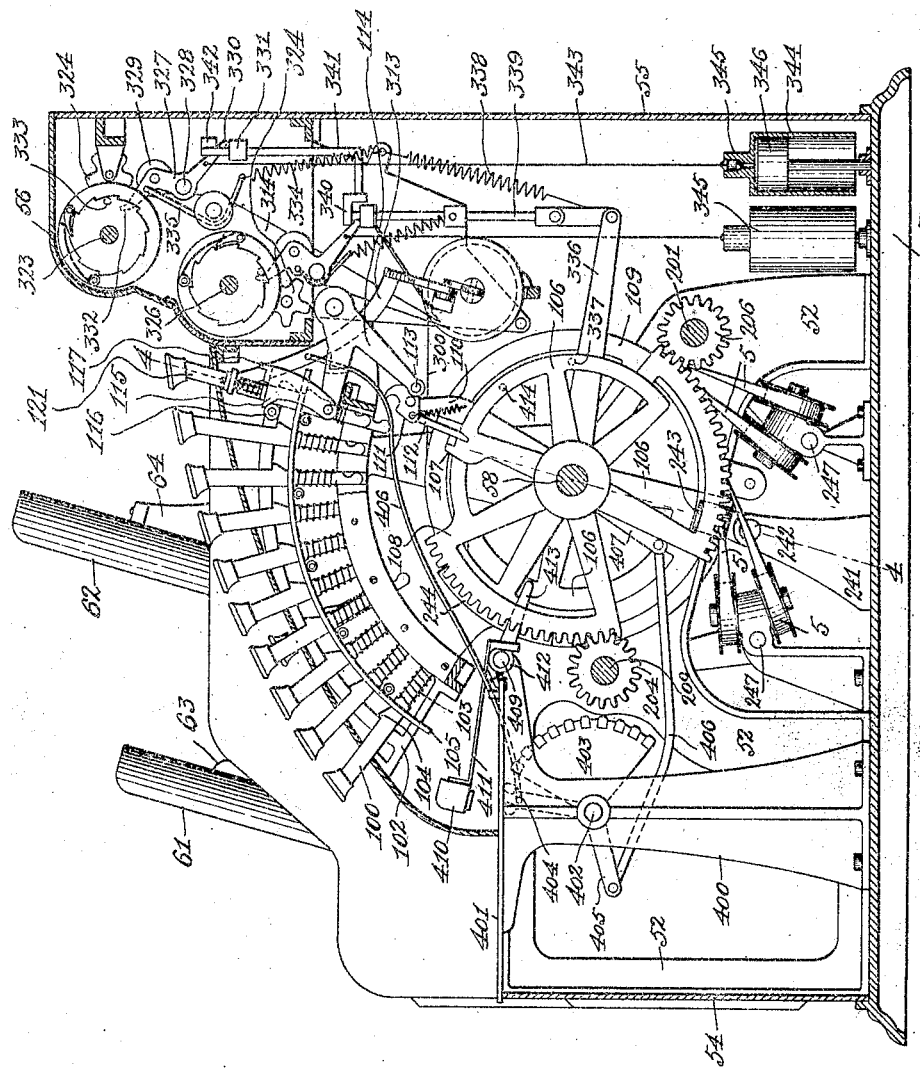
Figure 16:
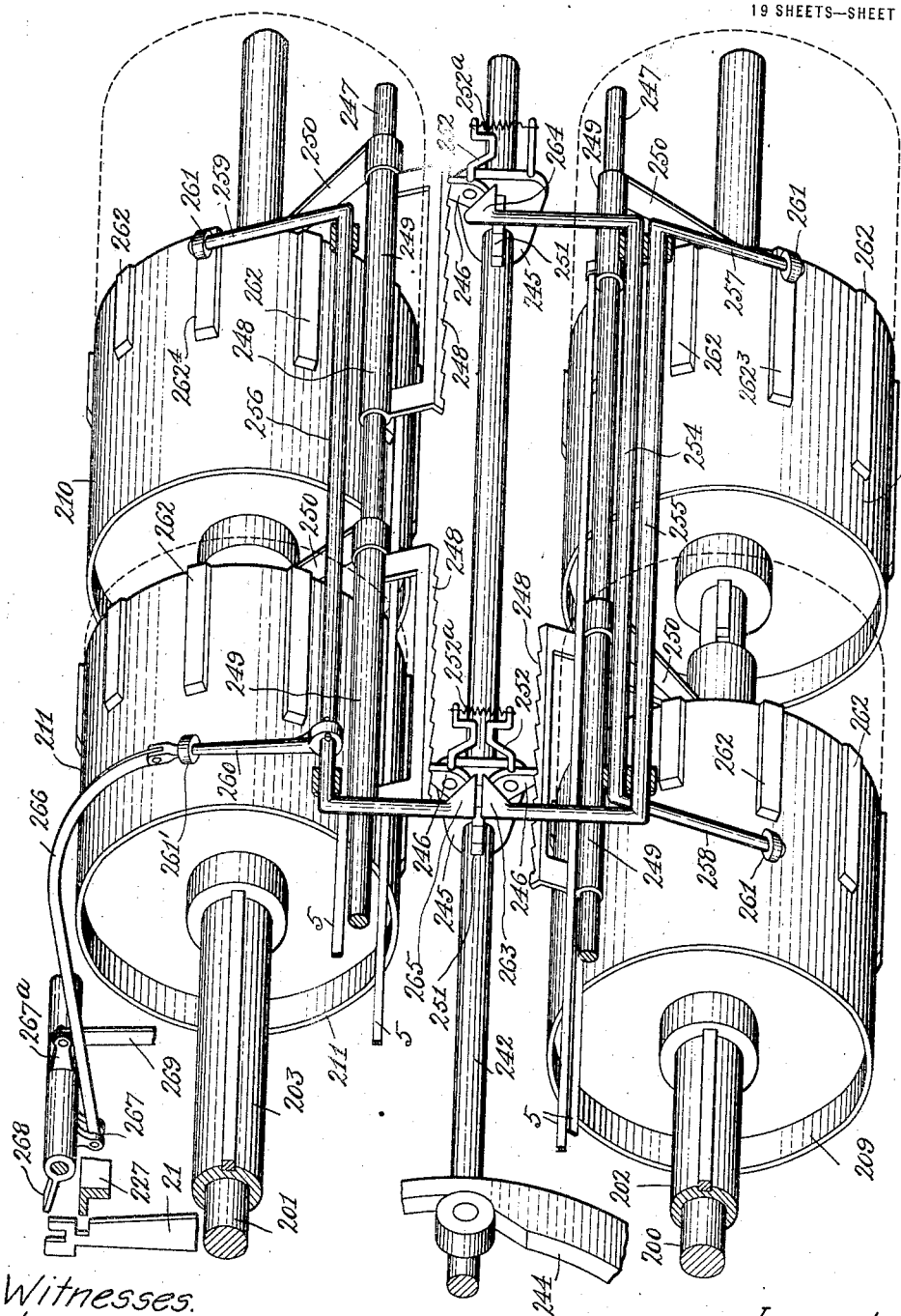
Figure 17:
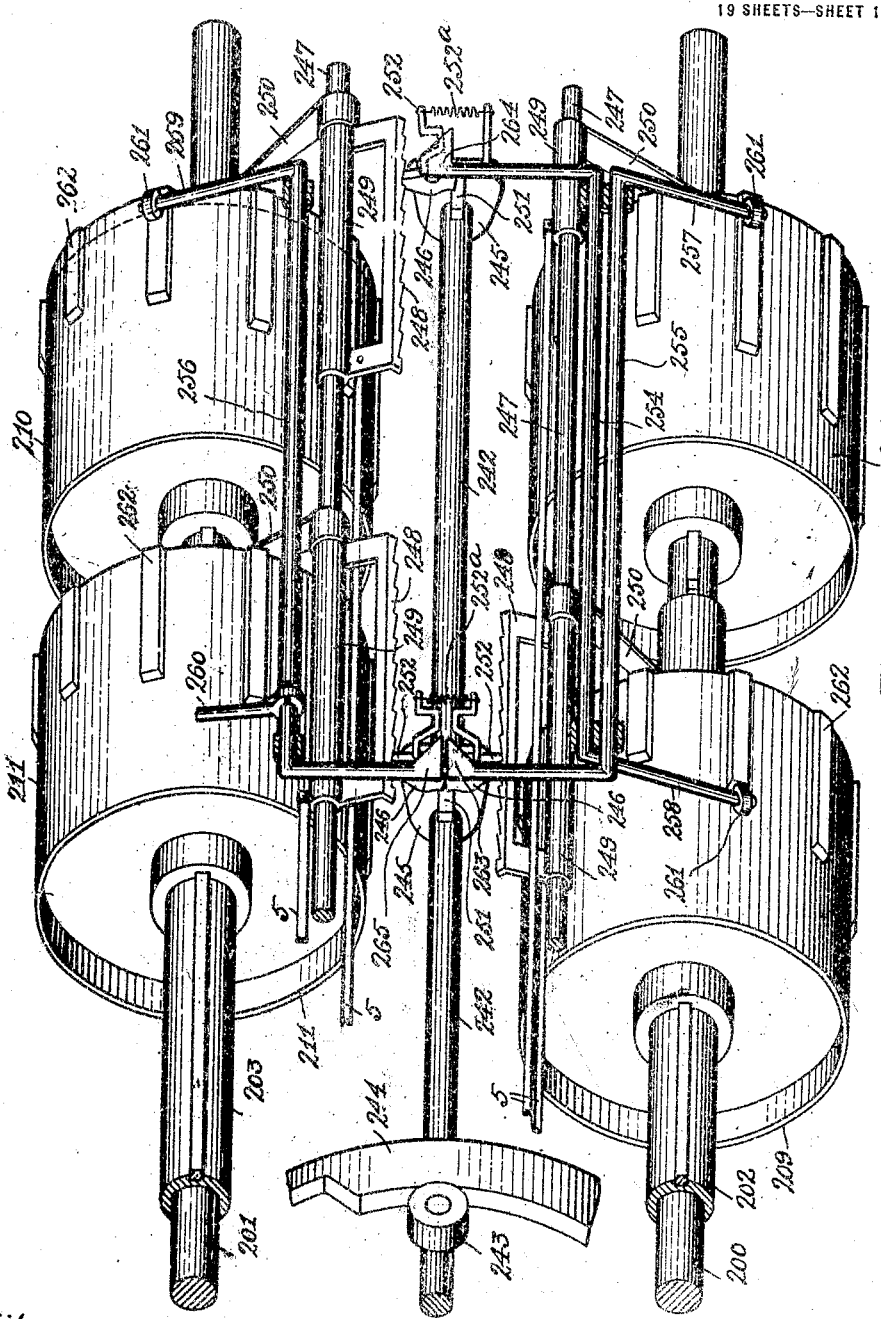
Figure 30:
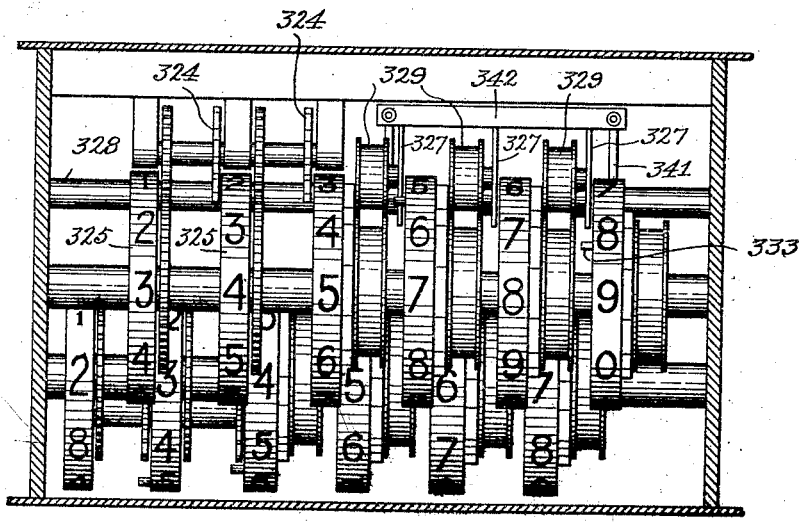
Figures 18, 19:
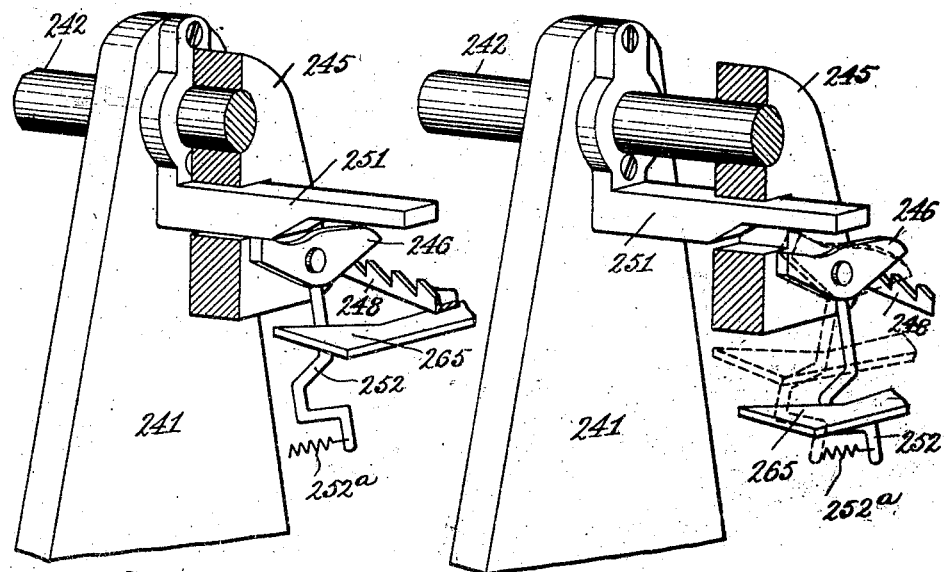
Figure 31:
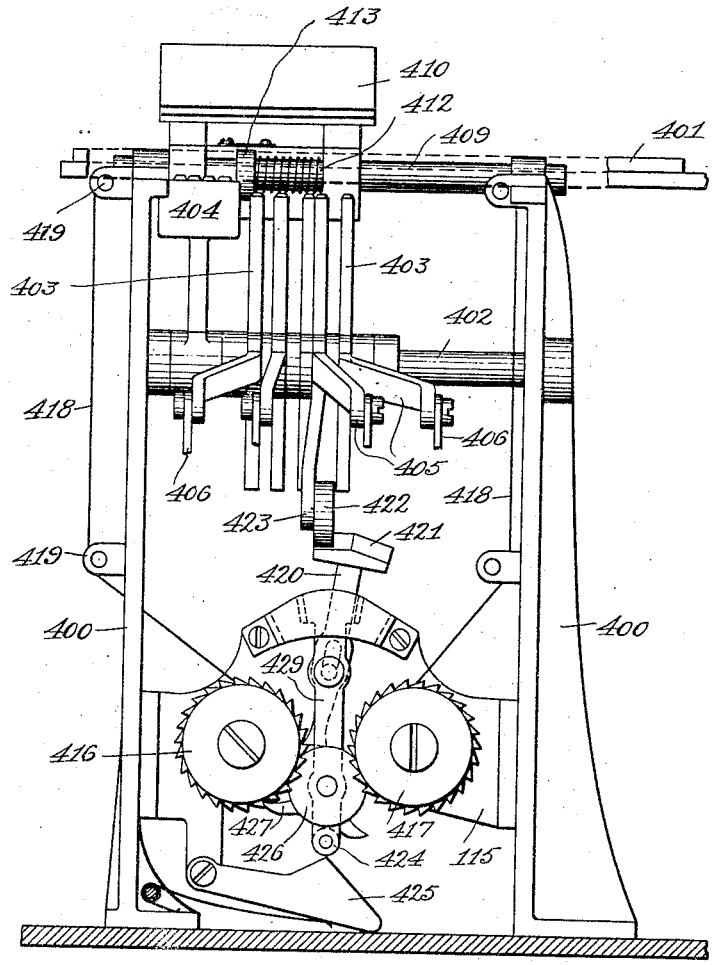

Referring to the accompanying drawings, in which a change making machine adapted for the handling of coins in amounts from one cent to ninety-nine dollars and ninety-nine cents is illustrated, Figure 1 is a front elevation of the machine; Fig. 2 is an elevation looking at the right hand end of the machine shown in Fig. 1. Fig. 3 is a view looking down on the top of the machine with a portion of the casing removed and a portion of the right hand end broken away. Fig. 4 is a sectional elevation in a plane indicated generally by the line 4—4, Fig. 6, but with portions broken away to show underlying mechanism and to permit of the drawing being made on a larger scale. Fig. 5 is a front elevation of the machine with the front casing, front coin chute, tray and stacks removed, certain portions of the mechanism in this view being also broken away. Fig. 6 is a sectional elevation looking at the right hand end of the mechanism within the casing. Fig. 7 is a sectional elevation on substantially the plane indicated on line 7—7, Fig. 5, with a portion of the operating handle in position to illustrate the relative positions of the parts. Fig. 8 is an enlarged perspective view of a fragment or portion of the key board designed particularly to illustrate the zero key depressing mechanism, etc., in normal position. Fig. 9 is a view substantially corresponding to Fig. 8, but with the zero key depressor in elevated position. Fig. 10 is a detail section showing the position of the ejectors and their actuating mechanism in normal or rest position. Figs. 11, 12 and 13 are views substantially similar to Fig. 10, but with the operating parts advanced in Fig. 11 to a position for beginning the depression of the selector pin carriage, in Fig. 12 advanced to the position of beginning the operation of the ejector, and in Fig. 13 advanced to a position where the ejector has been operated to discharge a coin. Fig. 14 is a detail sectional elevation showing one of the selector cylinders, ejector and locking mechanism in proper relation to one of the coin holders or stacks. Fig. 15 is a diagrammatic plan view illustrating the relative positions of the four selector cylinders together with the coin stacks and ejectors, and the positions of adjustment of said parts for a specific operation which will be hereinafter referred to. Fig. 16 is a perspective view looking at the under side of the selector cylinders and showing the mechanism whereby the cylinders of lower denominational order control the cylinders of higher order independently of the operating keys and also showing the ejector locking connections, but with the apertures in the cylinders omitted. Fig. 17 is a view corresponding to Fig. 16, but with the parts in the positions occupied by them when the machine has been operated in a certain transaction, some of the parts shown in Fig. 16, however, being omitted. Fig. 18 is a detail perspective view, with parts broken away and in section, showing the mechanism for carrying forward and locking the pawls through which the movement of the cylinders of higher denominational order are controlled by those of lower order. Fig. 19 is a similar view of the parts shown in Fig. 18, but in a position in which the pawl is tripped to release the cylinders of higher order. Figs. 20, 21, 22 and 23 are projections of the surfaces of the four selector cylinders, Fig. 20 being a view of the cents or units cylinder; 21, the dimes or tens cylinder; 22, the dollars or hundreds cylinder; and 23 the ten dollar or thousands cylinder. Fig. 24 is a perspective view illustrating somewhat diagrammatically the relation of the adding mechanism to the key and operating segments with the parts separated from their associated mechanism and supports. Fig. 25 is an enlarged sectional elevation illustrating the registering dial shifting mechanism. Fig. 26 is a view of a part of the mechanism shown in Fig. 25 with the parts in a somewhat different position. Fig. 27 is a section substantially on the line 27—27, Fig. 26. Fig. 28 is a perspective view of a portion of the carrying mechanism for the registering wheels. Fig. 29 is a similar view of the parts shown in Fig. 28 in the positions they assume when operated. Fig. 30 is a top plan view of the registering dials or wheels and the operating mechanism therefor. Fig. 31 is a front elevation of the recording or printing mechanism. Fig. 32 is a detail sectional elevation illustrating the preferred form of full-stroke mechanism, together with the governor for controlling the speed at which the parts may be operated. Fig. 33 is an elevation of the full-stroke and governor mechanism illustrated in Fig. 32.

Like reference numerals in the several figures indicate the same parts.

As indicated at the outset, the machine adopted for illustrating the present invention is one primarily designed for making computations in monetary transactions, where a given amount is deposited, and indicated on a suitable key board, together with another factor in the transaction, such, for example, as the amount or value of a purchase, and thereupon by the operation of the machine the correct change is ejected in position to be taken by one of the parties to the transaction. In connection with such computation and the return of change there is provided a registering mechanism which will be operated by the machine so as to register the totals of the sales made, and also a mechanism whereby a record of each sale may be made on a suitable check or slip, such for example, as the sales slip used in merchandise transactions at this day.

The preferred and most compact arrangement of the parts is well illustrated in Figs. 1 and 2 of the accompanying drawings from which figures it will be seen that all of the mechanism is mounted on the base 50 and substantially inclosed by a casing or cover formed by plates 54, 55, 56 and 57. The key board is arranged near the right hand end of the machine and the operating handle 59 at the extreme end, while, on the opposite side of the key board from the operating handle, there is arranged a series of coin trays, stacks or holders, preferably divided into groups indicated generally by the numerals 60, 61 and 62, the groups 60 and 61 being located in front of and slightly lower than the group 62. The coins ejected from the several groups all pass out at the front of the machine through the spout 2, where they may be received in the left hand of the operator of the machine or may drop into a suitable dish or tray. The spout 2 is funnel-shaped, as indicated by the dotted lines in Fig. 1, and receives directly the coins from the stacks 60 and 61, but the coins from the rear stacks are discharged into the upper end of a chute 3, which at its lower end communicates with the central portion of the chute which forms the spout 2, thus causing all of the coins to travel by gravity when they are discharged from the stack, down to a common point.

In the general arrangement of the parts, it will be further noted that the registering wheels or dials are located in rear and slightly above the level of the back portion of the key board while immediately in front of and below the level of the said key board there is provided a table 401, Figs. 1 and 6, upon which the check or other surface upon which the record is to be made, may be placed at the time when the machine is operated.

The grouping of the coin holders or stacks in banks or rows, one in front of and slightly below the level of the other, is not only a convenient and compact arrangement, but with such an arrangement, the stacks or holders may be conveniently subdivided into groups, each group representing a denominational order, for example, the group indicated by the reference numeral 60 is the units group; that indicated by 61, the tens group; and that indicated by 62, the hundreds and thousands group, the hundreds group being at the left hand end and the thousands group at the right hand end of the row.

There is provided a separate ejector for each coin stack or holder and for each group of said stacks or holders there is provided a group of keys representing values from 1 to 9, said group of keys for each group of stacks comprising one row of keys in the portion of the key board adapted to indicate the amount received, and the other row in the portion of the key board adapted to indicate the amount of the purchase; thus, we have for each denominational group of coin holders, a group of keys which may indicate the amount received and the amount purchased, and by the provision of four rows of keys in each side of the key board the capacity of the machine may be made to reach from transactions of one cent up to transactions of ninety-nine dollars and ninety-nine cents, and the whole mechanism may be so compactly arranged as that it will occupy but little space and may be made comparatively inconspicuous if so desired.

Referring particularly to the key board arrangement, there are preferably provided the eight rows of keys indicated by the reference number 100, each row having its finger piece provided with a number corresponding to the value accorded the key. As shown, said keys are numbered from 1 to 9, beginning at the top of each row. The four rows at the right hand side of the key board are the keys indicating the amount received, while the four rows at the left hand side of the key board indicate the value of a purchase. The rows are respectively units, tens, hundreds and thousands, beginning at the right hand side of the key board, the units row on the purchase side being the fifth row from the right hand side; thus, any desired amount may be set up in the key board on either side by depressing a key in each succeeding row, provided the sum does not exceed $99.99.

For convenience in mounting the internal mechanism, the base 50 is preferably provided with upwardly extending end frames 51 and 53 and an intermediate frame 52. These frames carry the plates which constitute the casing of the machine and are adapted to support certain of the shafts upon which the operating parts are mounted.

The main shaft of the machine indicated by the reference numeral 58, extends the full length of the machine, and at one end is provided with the operating handle 59, whereby this shaft may be oscillated by drawing the handle forwardly from the position indicated, for example, in Figs. 2, 7 and 10, to the positions indicated in Figs. 11, 12 and 13.

The movement imparted to the main or operating shaft 58 by the handle is utilized for positioning and operating the parts, but the movements imparted to the ultimate operating devices are controlled by the keys, whereby various differential movements may be effected, as will be presently described.

The mechanism which controls the selection of the ejector is generally, in so far as each individual unit is concerned, similar to the mechanism of my prior Patent No. 1,035,047; that is to say, there is a selector member, conveniently in the form of a cylinder which has its area subdivided into areas, each of which is in effect a separate selector. The said member or cylinder has progressive movement in two directions, the movement in one direction determining which of the selector areas shall be effective and the movement in the other direction determining which portion of the selected area shall be effective. The two movements may, of course, be combined in an effective movement which is direct but there are no movements in an opposite sense, such as necessitate an excessive movement in one direction followed by a movement in the opposite direction, in order to properly position the selector.

The forwardly progressive movement of the selector member or cylinder brings the proper effective area into proper relation to spring pressed pins or equivalent devices which directly control the ejectors. The movement in one direction is controlled by the received keys and in the other by the purchase keys of its group.

In the present machine, the capacity is increased by the provision of four selector cylinders, one for each denominational group of keys and ejecting mechanism, and each cylinder, together with its operating and control devices is independent of the others, in so far as transactions within its own capacity are concerned, but all are so correlated that when any selector is moved by one of its purchase keys of greater value than the value of its operated received key, the selector of next higher denominational value will be advanced one unit in a direction to reduce by one unit any amount which would be discharged through its operation, and if no key of the higher denominational value be operated, the ejecting mechanism will be locked so that no change whatsoever can be discharged. In other words, if the amount set up in the purchase keys is greater than the amount set up in the received keys, the machine will be locked so as to prevent the discharge of any change. If the amount set up in the purchase keys of any denominational group is greater than the amount set up in the received keys of the same group, the machine will be locked, but will be again unlocked if the received key of any higher denominational group be operated, and will also be set in such wise that the amount returned from the higher denominational group will be one unit less than the amount which would be returned if the conditions stated did not exist in the group of lower denominational value.

The selector cylinders for the several denominational groups are indicated by the reference numerals 208, 209, 210, and 211. Cylinder 208 is the units selector, and it is mounted to rotate in unison with but capable of a longitudinal movement on a shaft 200, which is journaled in the frames 51 and 53. The cylinder 209 is the tens selector, and it is mounted to rotate in unison with but slide longitudinally upon a sleeve 202 which is journaled upon the shaft 200 and projects through the frame 52 to a point beneath the key board. The cylinders 210 and 211 are the hundreds and thousands selectors, and they are mounted respectively on the shaft 201 and sleeve 203, corresponding in construction to the shaft 200 and sleeve 202, but located in rear of the latter and preferably at a somewhat lower level, as will be readily seen from an inspection of Fig. 7.

The units selector shaft 200 is adapted to be rotated by a pinion 204 meshing with a segment 108 journaled on the main operating shaft. The tens selector is adapted to be rotated by a pinion 205 on the sleeve 202, which meshes with a corresponding tens segment on the main operating shaft while the hundreds cylinder is similarly rotated by a pinion 206 on the shaft 201, meshing with a hundreds segment and the thousands selector is rotated by a pinion 207 meshing with a thousands segment corresponding to the units segment first above described.

For the purpose of moving the selector cylinders longitudinally of their axes, each cylinder is provided with a hub having an annular channel or groove therein for one end of an arm 250 (Fig. 4) which is mounted on or forms a part of what might be termed a selector carriage 249. The selector carriages are mounted to slide longitudinally on shafts 247 supported from the base 50, as shown in Fig. 6, and to each carriage there is attached one end of a flexible connection or steel tape 5, best seen in Figs. 4, 5 and 6. The flexible connections for the respective selector carriages pass around idlers 6, on the shaft bearings and at their opposite ends are connected respectively with sheaves 109, journaled on the main shaft 58. There is thus provided four sheaves each connected through its flexible connection with one of the selectors, and obviously rotation of the sheaves in one direction will advance the selectors in one direction. For moving them in the opposite direction, springs 7 are connected with the carriages and with some fixed part of the frame. The carriages for the tens, hundreds and thousands selectors are each provided with a longitudinally arranged rack bar 248, best seen in Figs. 16 and 17, said rack bars being adapted to control the movements of the selectors, one from the other by mechanism to be hereinafter described.

The gear segments 108 and the segments 109 to which the flexible connections are attached are journaled on the main shaft 58, but are adapted to be coupled thereto by mechanism which is under the control of the keys. The mechanism for effecting this coupling of each of the segments with the shaft is in all essential particulars similar to the mechanism described in my before mentioned patent, and may be briefly described as follows: Each of the segments 108 and 109 is provided with an arm 110 on which there is pivoted a dog 111 adapted to coöperate with the inner rounded end of any one of the keys which may have been depressed or operated, the character of the engagement being such that the dog will become locked to the key, to thereby arrest the forward rotation and lock the segment in accordance with the position of the key. Mounted rigidly on the shaft in proximity to each of the segments 108 and 109 is a segment 106 having at a suitable point in its periphery a seat or recess for the reception of the inner end of a pawl 112 which is pivotally connected with the dog 111, the arrangement being such that as the dog moves into engagement with and becomes locked to any one of the keys, the pawl will be withdrawn from its locking engagement with the segment 106 and the latter may continue its rotation or movement with the main operating shaft, while the selector actuating segment will be held in adjusted position. Each of the rows of keys is arranged in the key board so that their inner ends will form the segment of a circle, the operation of any key causing its inner end to project inwardly in a radial direction toward the main operating shaft, where it will be in position to be engaged by the dog 111, but inasmuch as for certain reasons which will hereinafter appear, the selectors should have a slight initial movement to bring them to their zero or first position, and as the segments should be disengaged from the operating shaft when the selector is at the zero position, unless some key of the particular row has been operated, a set of zero keys is provided which zero keys are automatic in their action, in that they do not have any finger pieces and are adapted to normally stand in the paths of the dogs carried by the segments. The said zero keys, indicated by the numeral 101 are in all respects, save for the fact that they have no finger pieces, similar to the other keys of the key board. All of the keys are provided with projections or inclines 104 adapted to coöperate with longitudinally movable retaining plates 105, whereby the operation of any key in a row will release all previously operated keys permitting them to resume their outer positions under the influence of their springs and the operated key will be itself retained by the plate until again released by the operation of some other key. The zero keys are adapted to be projected inwardly, and by their inward movements to release previously operated keys when the main shaft is returned to normal position. To provide for this operation there is pivotally mounted in the frame a pair of bell cranks 114, carrying between one pair of their arms a cross bar 113 with which the dogs 111 are adapted to contact when they return to normal position, as shown in Fig. 8, but as said dogs move forwardly in the initial operation of the machine, the bell cranks are permitted to swing under the influence of a spring 118 to the position shown in Fig. 9. Pivotally mounted on the other arms of the bell cranks is an upwardly extending swinging frame formed by bar 117 having end arms with their forward edges inclined at 115. When swung up to the position shown in Fig. 9 the bar 117 moves forwardly over the ends of the zero keys 101, under the influence of a spring 117$^a$ mounted on the bar 119, so as to overlie the upper ends of the zero keys, where it is in position ready to depress said keys when again moved down to the position shown in Fig. 8 by the return of the segments and dogs to normal position. As the frame 117 is drawn down to the position shown in Fig. 8, the inclines 115 thereon coöperate with rollers 116 on the fixed portion 102 of the key board frame, and as the zero keys reach their projected position, cause the frame 117 to swing backwardly or away from the zero keys, leaving the latter unrestrained, except for the retainers 105 which hold them depressed until a key is operated in the row in which each zero key is located. The cross piece or bar 119 before referred to and which is located between the arms of the bell cranks 114 is adapted when swung to the position shown in Fig. 9, to form a stop for preventing the rearward movement of the retainers 105, and consequently when the segments have been moved from their normal to zero position, or further, the keys will be absolutely locked against inward or outward movement, thereby preventing any possibility of a false manipulation of the keys after the operating movements have been inaugurated through the medium of the operating handle and main shaft.

In addition to the automatic setting of the zero keys through the mechanism described, provision is made whereby the released zero keys may be operated or pressed inwardly should it be desired to release the operated keys of the key board, as, for instance, when a mistake has been made in indicating the amount received or the value of a purchase, and this result is accomplished by providing keys 121 on cross pieces 120, located above the zero keys and above the bar 117. The keys 121 and bars 120 may be depressed against the tension of springs 120$^a$ when it is desired to accomplish the result just mentioned and the keys 121 are conveniently marked with the letter R, thus indicating that they are release keys. In the preferred construction, a separate release key is provided for the deposit and purchase sides of the key board, as will be readily understood from Fig. 4 of the drawings.

The peripheral surface of the four selector cylinders 208—11, inclusive, are provided with perforations for the reception of the ends of spring-pressed pins 215, which pins are adapted to control the ejectors, there being one pin for the ejector for each of the coin stacks or receptacles. As shown in the machine illustrated, the units group of stacks, four in number, are adapted to contain pennies and nickels; thus beginning at the left hand end, the first three stacks contain pennies, and the fourth stack nickels. The ejectors for the first two stacks each discharge one penny, the ejector for the third stack discharges two pennies and the ejector for the fourth stack discharges one nickel; thus, the operation of all of the ejectors will discharge nine cents. In the tens group, the five stacks are adapted to contain respectively and beginning at the left hand end, nickels, dimes, dimes, twenty-five cent pieces, and fifty cent pieces, and the ejectors are adapted to discharge one coin of each denomination at each operation. The hundreds group controlled by the cylinder 210 is adapted to contain dollars and five dollar coins; thus, the first three stacks contain dollars and the fourth stack five dollar gold pieces, and by the operation of the ejectors, the first two stacks will discharge one dollar each, the third stack two dollars, and the fourth stack five dollars. In the thousands group controlled by the cylinder 211, the first stack, beginning at the left hand end, is adapted to contain ten dollar coins, and the second, third and fourth, twenty dollar coins. The ejectors for the first three stacks discharge one coin each, and the ejector for the fourth stack two coins, so that in the thousands group a simultaneous operation of all of the ejectors will discharge the sum of $90. The arrangement will be best understood from the diagrammatic illustration in Fig. 15, where the amounts discharged by each of the ejectors is indicated within the circles representing the coin holders or stacks.

The ejectors for each stack will be best understood by reference to the enlarged view, Fig. 14, in which it will be seen that the ejector 221 is a reciprocatory bar having a pivotal movement at its rear end, so that it may be moved from the full line position down to the dotted line position, the extreme end of the ejector being slotted or recessed for the reception of the forward end of a foot 220, rigidly connected with one of the pins 215, while the lower edge of the ejector is notched or recessed at 228 for the reception of the upper edge of an angle iron operating bar 227. When in elevated position, as shown by full lines in the figure last referred to, forward movement of the ejector is prevented by engagement of it shoulder 221ª with the fixed frame 223, but when moved down to the dotted line position, the shoulder 221ª will be out of engagement with the frame and the ejector will be in engagement with its operating bar 227, whereby a forward movement of the latter will advance the ejector and by the engagement of the forward edge of the ejector with the bottom coin or coins of the stack, the coins will be pushed forward and discharged. Obviously, by arranging the stack of coins so that one or more coins is engaged by the ejector, any desired number of said coins may be discharged at each operation.

The selector pins 215, before referred to, are all mounted to slide longitudinally in a vertically movable frame 213 (Figs. 7 and 10 to 14, inclusive). The frame 213 is preferably carried by pins 212, Figs. 3 and 7, mounted to slide in bearings on the frame of the machine and a normal downward pressure may be exerted on the frame by springs 212ª, although the frame is adapted to be depressed and raised by positive operating connections to be presently referred to. Each of the pins is provided with a spring 219 by which it is normally held down to the limit of its movement in the frame 213, but will permit the frame to move downward independently of the pin, should the downward movement of the pin be arrested as by coming into contact with the surface of the selector cylinder.

The pins are arranged in groups for coöperation with the respective cylinders, as best seen in Fig. 3 of the drawing, each group being preferably diagonal with relation to the axis of the cylinder, whereby the openings or holes for the reception of the pins may be similarly grouped and thereby economize space, so that the cylinders may be reduced to the least practicable dimension. By reference to Figs. 20 to 23, inclusive, the arrangement of the openings in the cylinders will be readily understood. There are ten divisional areas of the cylinder corresponding to the rotary or angular movements and ten corresponding to the longitudinal movements.

When the cylinders are in position for coöperation with the pins at the zero positions, the pins will be over the imperforate portion of the cylinders at the upper right hand corners of Figs. 20 to 23. A movement of any one of the cylinders 208, 209 or 210 one step longitudinally will bring the first group of apertures of the cylinder beneath the pins and result in setting the ejectors to discharge nine cents, ninety cents and nine dollars from the respective stacks. A movement of one step angularly will bring but a single aperture in the cylinder into position for coöperation with one of the pins, thus setting the ejectors to discharge one cent, ten cents and one dollar, respectively. A corresponding movement of any cylinder both longitudinally and angularly invariably brings an imperforate section of the cylinder beneath the pins and none of the ejectors will be set for operation. Beginning with this imperforate portion in each section of the cylinder, the perforations are arranged so that the first longitudinal movement thereafter will bring perforations into position for setting the ejectors to discharge nine cents, ninety cents and nine dollars, and each succeeding movement longitudinally will set the ejectors for discharging one unit less, so that a cylinder having been positioned angularly any subsequent movement longitudinally will cause the cylinder to set ejectors for discharging one unit less than that indicated by the keys which control the movement. Such a supplemental longitudinal movement of the cylinders is contemplated independently of the keys, in order to deduct from the cylinders of higher denominational order one unit from the amount that would be discharged in all cases where the keys controlling the cylinder of lower denominational value indicate that the amount of a purchase exceeds the amount deposited, all as will be presently explained.

The operating bars 227 form the upper portions of rocking frames 225—226, respectively, pivoted at 224 and connected together for simultaneous movement by a link 234. They are adapted to be operated so as to advance and retract the ejectors and the frame 213 to be depressed, all by the operation of bell cranks 231 which are journaled on the main shaft 58. One arm of each bell crank is provided with a roller 230 operating on cam surfaces 229 at the ends of the frame 213, so as to positively depress said frame when the bell cranks are turned forwardly and to lift the same when the bell cranks are turned back to normal position shown in Figs. 7 and 10. Arms 232 of the bell cranks are provided with rollers 233 adapted to coöperate with the rear edges of the arms 226 of the ejector operating frames, so as to move said frames from the positions shown in Fig. 10 to the positions shown in Fig. 13, to thereby operate the ejectors.

For operating the bell cranks their downwardly projecting arms 235 are provided with pins 240 with which an arm 239 rigidly mounted on the main shaft is adapted to coöperate, there being a sufficient preliminary independent movement of the main shaft to insure the proper setting of the ejector cylinders before the arm 239 comes into engagement with the pin 240, whereby the bell cranks 231 partake only of the final portion of the movement of the main operating shaft. To return the bell cranks 231 and parts connected therewith to normal position, the arm 239 on the main shaft 58 is adapted to coöperate with a latch 236, pivotally mounted on the downwardly extending arm 235 of the bell crank, so as to lock the parts together, as shown in Figs. 11, 12 and 13, but the latch is released at the moment when the parts are brought back to the position shown in Fig. 11, by the engagement of the downwardly extending toe 237 of the latch with an adjustable stop or screw 238, preferably mounted on the ejector operating frame, such engagement tripping the latch away from the end of the arm 239 and permitting the latter to continue its motion independently of the bell crank and parts operated thereby.

With the mechanism so far described, the selecting mechanisms for the several denominational groups are set independently of each other, and the several ejectors are operated simultaneously for all of the groups, but it is obvious that with such an arrangement, if the value of a purchase indicated by the purchase keys in one group exceeds the value of the deposit indicated by the keys in that group, provision must be made for locking the machine so as to prevent the return of any change, and if a deposit is indicated by the deposit keys of a higher denominational group provision must be made whereby the machine must be unlocked and whereby also the amount returned by the ejectors of the higher denominational group shall be one unit less than that indicated by the operated deposit key of the group, for it is from this one unit that the change is to be deducted which will be returned by the group of lower denominational value. In arithmetical language, it is a simple process of subtraction, which must be accomplished mechanically, and if the subtrahend exceeds the minuend, the machine must invariably be locked so that no change will be returned, but if the minuend is made to exceed the subtrahend by the operation of a deposit key in a higher denominational group, the machine must be unlocked and the amount to be returned in change from the higher denominational group must be one unit less than that indicated by the operated key of that group.

To accomplish the desired end, advantage is taken of the fact that the arrangement of the apertures in the selector cylinders is such that each advance movement of a cylinder longitudinally of its axis, or in a direction controlled by the purchase side of the key board reduces by one unit the value of the change which will be returned by that denominational group in which the cylinder is located, which permits of the provision of a mechanical connection between the cylinders, whereby when any cylinder of a lower denominational order is moved longitudinally a number of steps exceeding the number of steps which it has been moved angularly, the next higher cylinder will be advanced longitudinally one step independently of the keys controlling the higher cylinder, and if no deposit key controlling a cylinder of higher order be operated, the final effect will be to lock the ejectors so that no change can be delivered.

Each cylinder is provided with what may be conveniently termed a complemental area through the medium of which one cylinder exerts its control over the cylinders of higher order independently of the keys, and these complemental areas only come into active position when the conditions before referred to pertain; that is to say, when the value of a purchase exceeds the value of a deposit. Conveniently, the complemental areas of the cylinders are formed by raising the surfaces, and the raised surfaces may take the form of ribs 262, of graduated length, and so positioned radially or angularly on the surfaces of the cylinders, as to coöperate with rollers 261 on the ends of rock shaft arms journaled in bearings on the base 50, to thereby control the movement of the cylinders of higher order.

By reference to Figs. 4, 7, 16 and 17, it will be seen that three rock shafts 254, 255 and 256 are journaled in bearings 253 mounted on the base 50. The rock shaft 254 is provided with an arm 258 carrying one of the rollers 261 for coöperation with the ribs on the cylinder 209; the rock shaft 255 is provided with an arm 257 having a similar roller for coöperation with the ribs on the cylinder 208; and the rock shaft 256 has an arm 259 provided with a roller for coöperation with the ribs on the cylinder 210. The movement of each rock shaft which is effected by the travel of its roller on to the complemental area of its cylinder is used to control the supplemental advance movement of the cylinder of next higher order, and while various mechanisms will at once suggest themselves to those skilled in the art for accomplishing this result in the illustrated and preferred mechanism, a longitudinally movable shaft 242 is mounted in bearings 241 on the base 50, and said shaft is provided at one end with a roller 243 adapted to coöperate with a cam 244 mounted on one of the segments 106, as shown in Figs. 4, 6 and 17 of the drawings. Said cam 244 comes into action to move the shaft longitudinally against the tension of spring 244ª, Fig. 4, immediately after the selector cylinders have been positioned through the manipulation of the keys and main shaft, but before the pin frame 213 has been depressed. The shaft 242 is provided with two enlargements or collars 245 upon one of which there are mounted two pivoted pawls 246 adapted to coöperate respectively with the racks 248 on the carriages 249 of the cylinders 209—11. The other enlargement or collar is provided with a single pawl 246 adapted to coöperate with the rack on the carriage of cylinder 210. All of said pawls are provided with downwardly extending arms or projections 252 and springs 252ª for advancing the pawls into position to coöperate with the racks. The rock shafts 254, 255, 256 are provided respectively with extensions or arms having inclines 264, 263 and 265, respectively, which inclines are adapted to normally occupy positions in which they will coöperate with the projections 252 to release the pawls from their engagement with the racks, and consequently in the normal operation of the machine, when the amount indicated by the deposit keys in each denominational group exceeds the amount indicated by the purchase keys in the group, the pawls are disengaged from the racks and the longitudinal movement of the shaft 242 by reason of th engagement of its roller with the cam 244 does not cause the cylinders to be set in a position which is in advance of that indicated by its operated key, but when the rollers on the rock shafts move onto the complemental areas of the cylinders the inclines 263, 264, and 265 will be moved into a position where they will not engage the projections on the pawls and consequently said pawls will remain active and when the shaft 242 is moved longitudinally the cylinders will be correspondingly advanced one step.

From Figs. 16 and 17 it will be seen that the rock shaft which has its roller in position to coöperate with the complemental area of cylinder 208 (units cylinder) controls the pawl for coupling the carriage of cylinder 209 (tens cylinder) with the shaft 242; the rock shaft which has its roller in position to coöperate with the complemental area of cylinder 209 controls the pawl for coupling the carriage of cylinder 210 (hundreds cylinder) with the said shaft; and the rock shaft which has its roller in position to coöperate with the complemental area of cylinder 210 controls the pawl for coupling the carriage of cylinder 211 (thousands cylinder) with said shaft. Through this arrangement, whenever a cylinder of lower denominational order is positioned by the operation of a purchase key of higher value than a deposit key, the pawl connecting the shaft 242 with the carriage of the cylinder of next higher order will be left in engagement with the rack and the higher cylinder will be advanced one step beyond the movement controlled by the keys for that cylinder.

On the rock shaft 256 which is operated by the complemental area of cylinder 210, there is pivotally mounted an arm 260 having thereon a roller 261' corresponding to the rollers 261 and adapted to coöperate with the complemental area of the cylinder 211. Said arm 261 is connected through a link 266 with a locking mechanism for the ejectors. Said locking mechanism consists essentially of two series of wings or blades 268 and 270 pivotally mounted immediately beneath the rear ends 221 of the two rows of ejectors and adapted to be turned from the position shown in full lines in Fig. 7 to the position shown in full lines in Fig. 14, to thereby lock the ejectors in their elevated positions where they cannot be operated or be moved down into engagement with their operating bars. The arm 260 before referred to is connected by the link 266 with an arm 267 on the pivoted wing 268 (see Fig. 16) and a link 269 (Figs. 7 and 16) connects arms 267ª with an arm 267ᵇ, whereby these two members are moved simultaneously into locking position when the roller on arm 260 moves onto the complemental area of cylinder 211.

With the cylinders in the zero position, the rollers 261 are in such position that they will move onto the complemental areas by the first longitudinal step. Assuming that the cylinder 208 is set by an operation in which the value of the purchase indicated by the key is greater than the deposit indicated by the deposit key, the roller 261 will move onto the complemental area of the cylinder 208, and as each of the other cylinders is advanced by the longitudinal movement of the shaft 242, their rollers will move onto the complemental areas, with the result that all of the inclines will be moved out of position to coöperate with the pawls 246, and all of the cylinders except the cylinder 208 will be moved forwardly one step, the thousands cylinder operating to lock the ejectors. If a deposit key of any cylinder of higher order than the cylinder 208 has been operated, its roller will not move upon its complemental area, and therefore cylinders of all higher orders will be released from their engagement with the shaft 242, the ejectors will not be locked and the only effect will be to advance one step that cylinder which has had its control deposit key operated, so as to deduct one unit from the amount which would otherwise be returned by the ejectors controlled thereby.

In order to release the pawls 246 from their engagement with the racks 248 when the parts resume their normal positions, fixed inclines 251 are mounted on the bearings 241, (see Figs. 18 and 19) and are adapted to project through the collars or enlargements 245 on the shaft in position to coöperate with the rear ends or heels of the pawls when the parts are in their normal positions, as shown in Fig. 18, but to allow the pawls to advance into engagement with the racks during the initial longitudinal movement of the shaft 242, as shown by the dotted lines in Fig. 19. If, however, the inclines 263—4—5 are in position to grip said pawls, they will be held out of engagement or released from engagement with the racks as shown by the full lines in Fig. 19.

With a machine of this character it is, of course, highly essential that provision should be made whereby a record shall be kept of the purchases, and in the machine illustrated provision is made whereby both cash and charge sales may be registered and the amount recorded on a suitable slip or check.

The means for registering is directly controlled or operated from the segments 109 with which the flexible tapes for moving the selector cylinders longitudinally are connected, and by reference to Figs. 24 to 29, inclusive, and Fig. 6, it will be seen that the segments 109 have attached to them flexible tapes 300, so as to overlie the tapes for moving the selector cylinders. At their opposite ends the tapes 300 pass around and are secured to pulleys or sheaves 301, and located on each side of the sheaves or pulleys 301 are companion sheaves or pulleys 302 and 303, said sheaves being all journaled on a tube 304. Either one or the other of the companion sheaves 302 and 303 are adapted to be coupled with the sheaves 301, a convenient and preferred arrangement being to provide a grooved bar or shaft 305 within the tube 304 and movable longitudinally through the medium of a bell crank 312 operated by a connection 313 depending from a shift key 314. The grooves in the shaft 305 are provided with a series of projections or keys 307 which will be moved longitudinally with the shaft by reason of their engagement with the grooves therein. Said keys extend outwardly into position to coöperate with key ways in the sheaves 300, 302 and 303, and in one position of adjustment of the bar 305 serve to connect the sheaves 301 and 302 and in the other position to connect the sheaves 301 and 303.

In the preferred construction a spring 311 holds the shaft 305 at one extreme of its movement, whereby the sheaves 301 and 302 will be coupled together. The sheaves 302 are adapted, through flexible connections or tapes 315, to operate registering disks 322 for registering cash sales, while the sheaves 303 are adapted through flexible connections or tapes 316 to operate registering disks or wheels 322ª, for registering charge sales whenever the shift key 314 is depressed.

The registering wheels are mounted on shafts 323 and 326 and the connections between the flexible tapes and wheels are preferably arranged as best seen in Figs. 28 and 29, that is to say, the tapes extend around and are secured to sheaves 318 journaled on the shaft 326 but connected therewith through an internal coil spring 319, whereby the tape is kept taut and the sheave 318 under a constant tendency to rotate in a direction to wind up the tape. A ratchet wheel 320 is formed on or attached to one edge of the sheave 318, and spring-pressed pawl 321 on the number disk 322 is adapted to coöperate with the ratchet wheel. From an inspection of Figs. 28 and 29, it is obvious that when the tape 316 is drawn downwardly as by the movement of the segment 109 in a direction to set the cylinder under the control of the purchase key, the number or registering wheel will be correspondingly rotated and the parts are so proportioned that the number wheel will be advanced a number of steps, corresponding to the position of the operated key. The flexible connecting tapes also serve as a convenient means whereby the carrying from one registering wheel to another may be easily effected, as it is a comparatively simple matter to interpose means whereby an intermediate portion of the tape may be deflected through the operation of one number wheel so as to cause the next higher number wheel to advance one step.

As shown in the drawings, bell crank levers 327 are pivotally mounted on shafts 328, one arm of each of said bell crank levers being adapted to carry an idler pulley 329 for coöperation with the connecting tape 316, the extremity 332 of the arm of said bell crank lever being also adapted to be engaged by a pin or projection 333, Fig. 6, on the side of the number wheel of next lower order than that operated by the tape with which the idler coöperates. The pin 333 by its coöperation with the bell crank serves to turn the bell crank on its center, but as this movement would be comparatively slight or would impose considerable work on the number wheels, provision is made whereby the initial movement of a bell crank caused by its engagement with the pin will throw the bell crank over the center, so to speak, and permit its throw to be completed by a spring.

The mechanism for accomplishing this result is simple and consists of a link 335 pivotally connected with the bell crank at one end and at its opposite end with a coil spring 334. With the parts in the position indicated in Fig. 28 it is obvious that the draft of the spring tends to hold the bell crank in normal position, but upon the engagement of the pin with the end of the bell crank the connection between the spring and bell crank will be moved past the pivotal center of the bell crank and the latter will be immediately drawn down to the position indicated in Fig. 29, thereby correspondingly shortening the operating tape for the wheel of next higher order and advancing the latter wheel one step.

When in normal position the arms 330 of the bell cranks are adapted to rest on a table or support 331, and to restore the parts to normal position, after having been operated, as shown in Fig. 29, a vertically removable bar is provided which will again draw the ends 330 of the bell crank down in position to rest on the table. The vertically movable bars are indicated in Fig. 6 by the numerals 340 and 342, the two bars being connected together by vertical bars 341 and both are mounted on side bars 339 which are guided in suitable bearings on the main frame. A spring 338 is provided for lifting the bars from the position shown in Figs. 6 and 28 to that shown in Fig. 29, and they are adapted to be again brought down by an arm 336, Fig. 6, pivotally connected to the lower ends of the side bars 339 and journaled on the main shaft 58 in position to be engaged by a pin 337 mounted on one of the segments 106. In operation, when the segment is returned to its normal position the bars 340 and 342 will be drawn down and the carrying mechanism restored to normal position ready for a subsequent operation.

Any sudden movement of the bell crank levers of the carrying mechanism such as would tend to cause the parts to overthrow, is checked by connecting said levers through connections 343 with dashpots 344 inverted over pistons 346 fixed to the base 50 and each preferably containing a valve 345, whereby the dashpots are free to move downwardly, but owing to the closure of the valve will be restrained in their upward movement.

If it becomes desirable to increase the number of registering wheels beyond the four wheels which can be operated from the segments 109, this may be accomplished by the use of the ordinary star wheel connections indicated in Figs. 6 and 30, at 324.

To provide for tightening and adjusting the tapes or flexible connections without involving the risk of breaking the same, it is preferred that they shall be connected with their sheaves and segments as illustrated in Fig. 27, in which figure it will be seen that the end of the tape 316 is connected by a loop with a link 317 lying within the sheave, and the opposite end of the link is held by an adjusting screw 317′, passing inwardly through the periphery of the sheave. By turning the screw in one direction or the other, the tape will be shortened or lengthened as the case may be. This figure of the drawing also illustrates the means employed for arresting the reverse rotation of the sheaves 301, 302 and 303, in such position that the sliding keys 308 may be readily moved longitudinally with the shaft into and out of engagement with the respective sheaves. This stop mechanism consists essentially of a bar 310 below the sheaves and a stop projection or tooth 309 on the periphery of each sheave, adapted to contact with the bar as shown in the figure last above mentioned.

The recording mechanism embodies a series of segments 403, journaled on a shaft 404 mounted in uprights 400, Figs. 5, 6 and 31, erected on the base 50 in front of the segments 109. Each register segment 403 has on its periphery type characters corresponding to the keys on the purchase side of the key board and each is connected through an arm 405 and link 406 with one of the segments 109, the parts being so proportioned that the register segments 403 are set by the movement of the segment 109 to bring type characters to the printing point which will correspond to the operated key of the group controlling the segments 109.

In addition to the segments 403 there is journaled on the shaft 402 a type carrier 404 having characters upon its face for indicating when the amount to be recorded is a charge sale. This type carrier 404 is connected by a link 406 with the charge key 313 (Fig. 6) whereby it will be brought to the printing point when the charge key is depressed.

The type on the segments and carrier are brought to a printing position immediately below a suitable opening in the table 401 and the impression is made by a hammer or platen 410 of considerable weight, which is mounted on a resilient arm 411 journaled on a support 409 and having a rearwardly extending arm 413 with which a pin 414 on the segment 106 is adapted to contact for depressing the arm 413, to thereby raise the platen. When the pin moves out of engagement with the said arm the platen descends with a resilient blow which will make a sharp and sufficient impression without leaving the platen in position to interfere with the movement of the check or surface on which the impression is made.

To give additional strength to the blow struck by the platen or hammer, a spring may supplement the weight of the same, such a spring being indicated at 412 in the form of a coil spring around the pivotal bearing 409.

The impressions are preferably made through an inked ribbon 418 (Fig. 31) which travels over rollers 419 from and to ribbon spools 416 and 417 journaled in bearings 415 between the lower portion of the uprights 400.

The ribbon rolls or spools 416, 417 are provided with peripheral ratchet teeth or wheels facing in opposite directions and located in proximity to each other. Said ratchet wheels are adapted for coöperation with a pawl 420 having at its upper end inclined faces 421 for coöperation with a roller 422 on an arm 423 carried by one of the printing or recording segments. The pawl is capable of being swung into engagement with either one or the other of the ratchet wheels so as to wind the ribbon in either direction, and for automatically shifting the pawl a pivoted bar 429 extends down into position for supporting a roller 426 adapted to rest on the ribbon being wound on the spools, whereby the roller and bar 429 will be shifted in one direction or the other depending upon the thickness of the windings of ribbon on the respective spools. Beneath the bar and in position to coöperate with a small roller 424 thereon is a spring-actuated cam lever 425, which will move the depending bar 429 and pawl in either direction after the roller 424 passes the crest or apex of the cam with the result that as soon as the ribbon on one spool has increased in diameter sufficiently to swing the bar 429 over the crest of the cam a sudden movement will take place to throw the pawl into engagement with the opposite ratchet wheel, thereby automatically reversing the direction of ribbon feed. For retaining the spool on which the ribbon is being wound against reverse rotation, a double arm pawl 426 is mounted on the depending bar 429 so as to coöperate with the particular ratchet wheel with which the pawl 420 coöperates.

In the operation of the machine keys are manipulated by being pressed inwardly to set up the proper amount of the purchase and deposit in the two sections of the keyboard and then the handle 59 is operated. Some suitable full stroke mechanism is provided, such, for example, as that illustrated in Figs. 32 and 33 for insuring a full and complete movement of the handle in each direction. The form of full stroke mechanism which is preferably employed embodies a ratchet segement 450 located on the main shaft within the frame so as to turn therewith, said segment being connected with the plunger 457, of a pivoted dashpot 458 by a suitable link 456. The plunger in the dashpot is provided with an opening at one side for a double-wedge-shaped cut-off 459, whereby the flow of liquid past the plunger from one side to the other of the dashpot will be graduated and restricted at the ends of the stroke. For coöperation with the segment 450 a double-ended pawl having operative ends 451 and 452 is pivotally mounted on the frame and held with one or the other of its ends in position to engage the rack segment by a spring 455 adapted to work across the pivotal center of the pawl. Pins 454, which coöperate with an arm 453 on the pawl, serve to reverse the pawl when the segment and handle have reached opposite ends of their stroke, so as to limit further movement in that direction and to insure a full movement in the opposite direction.

The operation of the machine will be best understood by a series of examples involving various conditions. If one dollar is received and nothing purchased, the key marked "1" on the third row from the right is depressed and the zero key in the same row is thereby released. When the operating lever is carried forward all the cylinders are rotated and simultaneously moved longitudinally a short distance, until the segment arms are arrested by the zero keys, after which the dollar segment arm continues its movement until it is arrested by the No. 1 key, resulting in a continued rotation of cylinder 210, a distance of one space. This angular movement of the cylinder brings a hole, which is indicated by the numeral 500 in Fig. 22, under one of the dollar pins of the set 216 (Fig. 3), to wit: the second pin from the front. The rollers 230 (Figs. 7, and 10 to 13) depress the frame 213, the pin enters the hole in the cylinder, the corresponding ejector 221 is dropped into operative engagement with its bar and as the bar advances a one dollar coin is ejected and passes down out of the chute.

If the same key is operated and also the one dollar purchase key, the segment arm for the latter will be arrested by the key in the seventh row from the right, the cylinder 210 will thus be advanced longitudinally one space, and the pins will all be arrested by the imperforate surface of the cylinder at 502, Fig. 22, no coin being ejected. Whenever the selector cylinders are moved angularly and longitudinally equal spaces, as is always the case when the amount set up in the received or deposit side of the key board corresponds to the amount set up in the purchase side of the key board, a blank space is brought beneath the pins so that downward movement of the pins is arrested and no change is ejected.

If the one dollar key is operated in the received section and the two dollar key in the purchase section of the key board, the same operation takes place, except that the cylinder 210 is advanced longitudinally two spaces, the rib 262' on cylinder 211, Fig. 23 (which latter cylinder is advanced longitudinally one space and not tripped back because the cylinder 210 has its complemental area or rib operative) contacts with the roller 261', Fig. 16, thereby operating the locking wings 268 to the left, preventing the movement of the ejectors down into engagement with their operating bars and no coins can be ejected, notwithstanding the fact that the pins 216 are over the row of holes 501 in the cylinder 210 (Fig. 22).

If the sum of $25.62 is operated on the received key board and $19.59 on the purchase side of the key board and the handle operated to advance the parts to a position where the cam 244 begins to operate, the cylinders will have taken the positions shown in Fig. 16. Cylinder 208 is in position to pay three cents from holes 503 and 504, Fig. 20; cylinder 209 to pay ten cents from hole 505, Fig. 21; cylinder 210, six dollars from holes 506 and 507, Fig. 22; and cylinder 211, ten dollars from hole 508, Fig. 23. Rollers 261 will rest on ribs 262³ and 262⁴, Figs. 20 and 22. Upon further advancing the operating handle, the roller 243 rides on the cam 244, the pawls 246 operate in connection with the racks, and the cylinders take the position shown in Fig. 17. The cylinder 209 has advanced one space because the roller 261 riding on the third rib of cylinder 208 prevents the cam arm 263 from tripping the pawl 246 and the cylinder 209 is therefore retained in its advanced position, thereby locating the pins over the blank space 509, Fig. 21, on the cylinder and preventing any payment. Cylinder 210 was advanced one step and the cam arm 264 tripped the pawl 246 and the cylinder returned to its original position, where it will control ejectors to pay six dollars. Cylinder 211 has been advanced one step and retained, because the incline 265 has been raised by the roller on arm 259, resting on the sixth rib of cylinder 210, thereby preventing the pawl from being tripped, and consequently the cylinder is in such position that the pins fall on a blank space and nothing is paid. The cylinders are according to the above, in position to pay three cents, zero, six dollars and zero, respectively, or a total of $6.03, which is the change required in the transaction.

If the sum of $89.08 be set on the received section of the key board and $60.15 on the purchase section of the key-board, and the operating lever advanced a full stroke, cylinders 209 and 211 advance one space independently of the key control and are tripped back by having the pawls disengaged from the racks; cylinder 210 advances one space longitudinally and is retained. The cylinders are then in the position shown in Fig. 15. Cylinder 208 will permit the ejectors to be set for the payment of three cents; cylinder 209, ninety cents; cylinder 210, eight dollars; and cylinder 211, twenty dollars, making a total of $28.93. In this operation the pins operate in sets of holes 510, Fig. 20; 511, Fig. 21; 512, Fig. 22; and 513, Fig. 23, while the roller 261 on arm 258 is resting on the complemental area or rib on cylinder 209.

Having thus described my invention, what I claim as new and desire to secure by Letters Patent of the United States, is:

1. A machine such as described, embodying money delivering mechanism, operating mechanism therefor, embodying keys indicating the sum deposited and keys indicating the value of a purchase, and a locking mechanism for the delivering mechanism rendered operative when the value of operated purchase keys exceeds the value of operated deposit keys.

2. A machine such as described, embodying money delivering mechanism, operating mechanism therefor embodying keys indicating the sum deposited and keys indicating the value of a purchase, and locking mechanism for the delivering mechanism operated by the relative movement of the parts to lock the delivering mechanism when the value of the purchase indicated by the purchase keys is greater than the sum deposited and indicated by the deposit keys.

3. A machine such as described, embodying delivering mechanism, operating mechanism therefor embodying a selector movable in two directions, a separate set of keys controlling the movement of the selector in each direction, and a locking mechanism for the delivering mechanism set by the selector when the effective movement in one direction exceeds the effective movement in the other direction.

4. A machine such as described embodying delivering mechanism, operating mechanism therefor embodying a selector movable angularly about an axis and longitudinally of the axis, a separate set of keys controlling the movements in each direction, and a locking mechanism for the delivering mechanism operated by the selector when the effective movement in one direction exceeds the effective movement in the other direction.

5. A machine such as described, embodying delivering mechanism, operating mechanism therefor embodying a selector movable angularly about an axis and longitudinally of the axis, a separate set of keys controlling the movement in each direction, and a locking mechanism for the delivering mechanism operated by the selector when the effective longitudinal movement exceeds the effective angular movement.

6. A machine such as described, embodying delivering mechanism, an operating mechanism therefor embodying a selector movable angularly and longitudinally of its axis and having its surface divided into main and complemental areas of different diameters, separate sets of keys, one set controlling the movement of the selector in each direction, and a locking mechanism for delivering mechanism operated by its coöperation with the complemental area of the selector.

7. A machine such as described, embodying delivering mechanism, operating mechanism therefor embodying a selector movable angularly and longitudinally of its axis and having its surface divided into main and complemental areas of different diameters, and the complemental area sub-divided to form longitudinal ribs, separate sets of keys, one set controlling the movement of the selector in each direction, and a locking mechanism for the delivering mechanism operated by its coöperation with the ribs of the complemental area of the selector.

8. In a change making machine, a plurality of delivering mechanisms arranged in denominational groups, a group of corresponding but independent purchase and deposit keys for each denominational group, and operating mechanism independent of the keys and operating subsequent to the operation of the deposit keys for controlling the denominational groups of higher order to deduct one unit from the amount delivered whenever a purchase key of higher value than a deposit key is operated in the keys for the next lower denominational group.

9. A change making machine embodying delivering mechanism divided into denominational groups, a plurality of selectors, one for each group, separate groups of keys divided into sets indicating the value of a purchase and the sum deposited, one group for each selector, and mechanism controlled by one selector for advancing the selector of next higher order, one step independently of its controlling keys, whenever a purchase key of higher value than a deposit key is operated in the group controlling the selector of next lower order.

10. A change making machine embodying a plurality of groups of delivering mechanisms substantially corresponding to the decimal system, a separate selector for each group, a separate group of keys controlling each selector, and mechanism intermediate the selector and independent of the keys for advancing a selector one step when the selector of the next lower order is positioned by a purchase key of higher value than a deposit key.

11. A change making machine embodying delivering mechanism divided into denominational groups, a plurality of selectors, one for each group and each having main and complemental areas, of different diameters, a separate group of keys controlling each selector, and mechanism for advancing a selector of higher order one step independently of its controlling keys rendered operative by coöperation with the complemental area of the selector of next lower order.

12. In a change making machine, a delivering mechanism divided into denominational groups, a plurality of selectors, one for each group, and each having main and complemental areas, a separate group of purchase and deposit keys controlling each selector, and mechanism coöperating with the complemental area of one selector and controlling a movement of the selector of next higher order independently of its controlling keys.

13. A change making machine embodying delivering mechanism divided into denominational groups, a plurality of selectors, one for each group and all movable angularly and longitudinally of their axes, a separate group of keys for each selector, each group embodying keys indicating the value of a purchase and keys indicating the sum deposited, and mechanism operated by one selector whereby the advance of the selector of next higher order one step independently of the controlling keys is effected when the movement of the selector of lower order in one direction exceeds its movement in the other direction.

14. A change making machine embodying delivering mechanism divided into denominational groups, a plurality of selectors, one for each group, each selector being movable, both angularly and longitudinally of its axis, and each divided into main and complemental areas, a separate group of keys for each selector, each group comprising independent keys for controlling the angular and longitudinal movements of its selector, and mechanism operated through its coöperation with the complemental areas of the selectors, whereby a selector of next higher order will be advanced in a subtracting direction one unit more than indicated by its key.

15. In a change making machine, a delivering mechanism divided into denominational groups, a plurality of selectors one for each group and each movable angularly and longitudinally of its axis, a separate group of keys for each selector, each group embodying keys controlling the angular movement of its selector and keys controlling the longitudinal movement of its selector, and means for imparting a supplemental movement in a subtracting direction to selectors of higher order independently of the keys and controlled by the selector of next lower order.

16. A change making machine embodying delivering mechanism divided into denominational groups, a plurality of selectors, one for each group and each movable angularly and longitudinally of its axis, separate groups of keys controlling each selector, each group embodying a set of keys controlling the angular movement and a set of keys controlling the longitudinal movement of the selector, and operating mechanism for imparting a supplemental movement to selectors of higher order independently of its keys, and controlled by the selector of lower order to advance the selector of higher order one step when the movement of the selector of lower order in one direction exceeds its movement in the other direction.

17. A change making machine embodying delivering mechanism divided into denominational groups, a selector for each group movable angularly and longitudinally of its axis, a separate group of keys for positioning each selector embodying a set of keys controlling the longitudinal movement and a set of keys controlling the angular movement of the selector, mechanism for imparting supplemental longitudinal movement to the selector independently of the keys, mechanism operated by each selector to control the supplemental movement of the selectors, and means for locking the delivering mechanism when the selectors are set by the operation of purchase keys of higher value than the operated deposit keys.

18. In a change making machine, the combination with a plurality of selectors each movable both angularly and axially, a single operating shaft and handle, and separate driving connections between said shaft and each selector, one for moving the selector axially and the other for moving it angularly, of a separate group of keys for each selector, each group embodying a set of purchase keys and a set of deposit keys, means controlled by said keys for disconnecting the driving connections between the shaft and selector, and operating connections intermediate the selectors whereby a supplemental movement independently of the movement determined by the keys may be imposed by one selector upon another.

19. In a change making machine, the combination with a series of selectors movable both angularly and axially, an operating shaft and handle, separate driving connections between said shaft and each selector, one for moving the selector axially and the other for moving it angularly, of key controlled means for disconnecting the driving connections independently of each other, whereby the extent of movement of each selector in each direction may be determined, and driving connections for imposing a supplemental movement on the selectors in one direction, with means whereby the supplemental movement of one selector is controlled by the selectors of lower denominational order.

20. In a change making machine, the combination with a series of selectors each movable both angularly and axially, an operating shaft and handle, separate driving connections between said shaft and each selector, one for moving the selector axially and the other for moving it angularly, key controlled means for disconnecting the driving connections between the shaft and selectors, means for locking the selectors against movement in one direction when disconnected from the operating shaft, and means for imparting a supplemental movement to said selectors in the other direction independently of the keys.

21. In a change making machine, the combination with a series of selectors each movable both angularly and axially, an operating shaft and handle, and separate driving connections between said shaft and each selector, one for moving the selector axially and the other for moving it angularly, of a group of keys for each selector, said groups embodying sets of deposit and sets of purchase keys, means controlled by the keys of each set of a group for disconnecting one of the driving connections between the shaft and selector independently of the other, and means for augmenting the movements of the selectors in one direction independently of the keys, and means whereby such additional movement of each selector is controlled by another selector of the series.

22. In a change making machine, the combination with a series of key set selector cylinders, having coin delivering mechanism controlled by said selector cylinders, of means for controlling said cylinders one from the other, embodying a driving shaft, pawl and rack connections between said shaft and selectors, and operating connections extending from one selector into proximity to the pawl and rack connection of another selector for disengaging the same.

23. In a change making machine, the combination with coin discharging mechanism and a series of key set selector cylinders controlling said discharging mechanism, of means whereby one selector cylinder is controlled from another, embodying an operating shaft, connections intermediate said shafts and selectors, and means controlled by one selector for disconnecting the driving connection between the shaft and another selector.

24. In a change making machine, the combination with coin discharging mechanism and a series of key set selectors controlling said discharging mechanism, of means whereby one selector controls the position of another, embodying an operating shaft, driving connections intermediate said shaft and selectors, projections on the selectors and mechanism operated by said projections on one selector for controlling the connections intermediate the shaft and another selector.

25. In a change making machine, the combination with a series of angularly and longitudinally movable selector cylinders, coin discharging mechanism controlled thereby and sets of keys for determining the angular and longitudinal positions of the respective cylinders, of means for imposing a supplemental longitudinal movement on the cylinders, embodying a reciprocatory operating shaft, rack and pawl connections intermediate said shaft and selectors, inclines for disconnecting said rack and pawl connections, and connections intermediate said inclines and selector cylinders, whereby one cylinder will control the connections between the operating shaft and another cylinder.

26. In a change making machine, the combination with a series of selector cylinders movable angularly and longitudinally, coin discharging mechanism controlled thereby, and keys for controlling the angular and longitudinal position of the cylinders, of means for imparting supplemental movements to the cylinders, embodying a reciprocatory operating shaft, pawl and rack connections intermediate said shaft and cylinders, mechanism for disconnecting said pawl and rack connections, and projections on the cylinders controlling said mechanism, whereby one cylinder will govern the supplemental movement imparted to an adjacent cylinder.

27. In a change making machine, the combination with coin discharging mechanism, a series of selector cylinders mounted in pairs on parallel shafts, with keys for controlling the angular and axial movements of said cylinders, of a reciprocatory frame above said cylinders, spring-pressed pins in said frame for coöperation with the cylinders and controlling the discharging mechanism, an operating shaft and independent connections intermediate said shaft and cylinders and intermediate said shaft and pin carrying frame, whereby the cylinders will be set during the initial movement of the shaft and the pin carrying frame operated during the subsequent movement of the shaft to selectively determine which portions of the discharging mechanism shall be rendered operative.

28. In a change making machine, the combination with a series of selector cylinders mounted on parallel shafts to move both angularly and axially and keys for determining both the angular and axial positions of the cylinders independently of each other, with means under the control of the cylinders for imparting supplemental movements to each other, of a movable pin frame, spring-pressed pins mounted in said frame for coöperation with the respective cylinders, and ejectors controlled by the respective pins, with means for simultaneously operating the ejectors selectively determined by the coöperation of the pins and cylinders.

29. A change machine embodying a delivering mechanism, independent selectors controlling the delivering mechanism and mounted on concentric axial supports, pinions on said supports and key controlled segments meshing with the pinions for moving the selectors angularly, key controlled segments, flexible connections intermediate said last named segments and cylinders for moving the cylinders longitudinally of their axes, and means whereby supplemental longitudinal movements may be imparted to the cylinders under the control of a companion cylinder and independently of the keys.

30. A change machine embodying money delivering mechanism, two pairs of independent selector cylinders, each pair having concentric axial supports and each movable independently longitudinally of its axis, key controlled operating mechanism connected with said axial supports for rotating the cylinders, sliding carriages for moving the cylinders longitudinally of their axes, key controlled operating mechanism connected with said carriages, and means whereby supplemental longitudinal movement may be imparted to said carriages independently of the keys.

31. A change machine embodying a plurality of angularly and axially movable selector cylinders, an operating shaft and handle, key controlled connections intermediate the shaft and selector cylinders for moving said cylinders both angularly and axially, a group of spring-pressed pins for coöperation with each of the selector cylinders, a movable frame in which all of said groups of pins are mounted, a retarded motion driving connection between the operating shaft and frame, whereby the cylinders will be positioned preliminarily to the movement of the frame, and groups of delivering mechanisms controlled by the spring pressed pins.

32. A change machine, embodying a plurality of selector cylinders movable both angularly and axially, a main operating shaft and handle, key controlled connections intermediate the shaft and cylinders for positioning them both angularly and axially, groups of spring pressed pins for coöperating with the respective cylinders, a frame movable toward and from the cylinders in which all of said groups of pins are mounted, a retarded motion driving connection intermediate the frame and main shaft, whereby the frame is operated after the cylinders are positioned, ejectors controlled by the respective pins, operating mechanism for advancing the ejectors, and a retarded motion driving mechanism intermediate the ejector operating mechanism and main shaft, whereby the ejectors are advanced subsequent to the positioning of the cylinders and coöperation of the pins therewith.

33. A change machine, embodying a plurality of angularly and axially movable selector cylinders, a main operating shaft and handle, key controlled connections intermediate the shaft and cylinders for positioning the same both angularly and axially, groups of spring-pressed pins for coöperating with the respective cylinders, a retarded motion operating mechanism for said pins moved by the operating shaft, groups of ejectors controlled by the spring-pressed pins, a reciprocatory operating mechanism for said ejectors, a retarded motion driving mechanism for advancing the selected ejectors subsequent to the positioning of the cylinders and pins, and means whereby supplemental movements independently of the keys may be imparted to the cylinders under the control of the cylinders themselves.

34. A change machine embodying ejecting or delivering mechanism, a series of key controlled selectors for determining which ejectors shall be operated, and means for imparting supplemental movements to the selectors independently of the keys, embodying an operating shaft, pawl and rack connections intermediate said shaft and selectors, means controlled by one selector for disengaging the pawl and rack connection of another selector, and means for disengaging all of said pawl and rack connections when the selectors are in normal position.

35. A change machine embodying a plurality of selectors, a group of ejectors controlled by each selector and key controlled means for positioning the selectors combined with means for imparting supplemental movements to the selectors independently of the keys and embodying an operating shaft, pawl and rack connections intermediate the shaft and selectors respectively, means controlled by one selector for disconnecting the pawl and rack connection of another selector, and fixed inclines for disconnecting all of the pawl and rack connections when the selectors return to normal position.

36. In a change machine, the combination with groups of ejectors, a selector controlling the ejectors of each group, and groups of keys controlling the positioning of each ejector, of zero keys for each group of ejector controlling keys, each individually released and automatically withdrawn from operative position by the operation of the ejector controlling keys of its group, and means for resetting said zero keys to normal position, embodying a bodily movable swinging frame, means for elevating said frame during the initial forward movement of the selector, and means for depressing said frame to project the zero keys during the final return movement of the selectors and for simultaneously withdrawing said frame from its engagement with the zero keys, whereby said keys may be withdrawn from operative position by the subsequent manipulation of selector positioning keys.

37. In a change machine, the combination with groups of ejectors, a selector controlling the ejectors of each group, groups of selector controlling keys, one group for each selector and zero keys for each group of selector positioning keys, with means whereby the operation of any selector positioning key will release its corresponding zero key, of a zero key setting mechanism embodying a bodily movable swinging frame, bell crank supports for said frame with connections whereby said supports are advanced and the frame elevated during the initial forward movement of the selectors, and again retracted and the frame depressed during the final return movement of the selectors, and a bar carried by said support for locking all of the keys against operation during the movements of the selectors and during the time when said selectors are positioned for controlling the ejectors.

38. In a change machine, the combination with coin ejecting mechanism, selectors therefor, and an operating shaft with detachable connections intermediate said shaft and selectors, of keys for controlling said connections, arranged in groups, one group for each selector, and the groups sub-divided into two series for controlling different movements of the selectors, a retainer for holding the keys of each of the series in operated position, a zero key for each of the series of keys, operating mechanism for said zero keys embodying a vertically movable frame for depressing the zero keys, and a bar movable with said frame and coöperating with the key retainers to lock the same against movement when the zero key operating frame is elevated.

39. In a change machine, the combination with coin ejecting mechanism divided into denominational groups, a selector for each group movable angularly and axially, key controlled operating mechanism for the respective selectors embodying segments, and flexible tape connections intermediate said segments and selectors, one for each selector, a number wheel for each selector, a flexible tape connection intermediate the number wheel and segment of its selector, and means controlled by the number wheel for one selector for deflecting the tape connection between the number wheel and segment of another selector, whereby the number wheels of selectors of higher order may be advanced by the operation of a selector segment of lower order.

40. In a change machine, the combination with groups of ejectors and an angularly and axially movable selector for the ejectors of each group, key controlled operating segments for positioning the selectors, a number wheel corresponding to each selector, a flexible tape connection intermediate the number wheel and operating segment for each selector, of spring actuated guides for deflecting the tape connections of some of the number wheels, means carried by the number wheels of lower order for inaugurating the movement of said spring actuated guides for deflecting the tape connections of number wheels of higher order, whereby the number wheels of higher order will be operated independently of the selector segment, and means for restoring said spring actuated guides to normal position.

THOMAS IRVING POTTER.

Witnesses:
TRUMAN J. GLOVER,
ALEXANDER S. STEUART.